US009144756B2

(12) United States Patent
Liu et al.

(10) Patent No.: US 9,144,756 B2
(45) Date of Patent: Sep. 29, 2015

(54) FUNCTIONALIZED SUBSTRATES WITH AROMATIC STACKING PROPERTIES

(75) Inventors: Xiaodong Liu, Cupertino, CA (US); Jinhua Chen, San Jose, CA (US); Christopher A. Pohl, Union City, CA (US)

(73) Assignee: Dionex Corporation, Sunnyvale, CA (US)

( * ) Notice: Subject to any disclaimer, the term of this patent is extended or adjusted under 35 U.S.C. 154(b) by 710 days.

(21) Appl. No.: 13/111,882

(22) Filed: May 19, 2011

(65) Prior Publication Data
US 2011/0284465 A1  Nov. 24, 2011

Related U.S. Application Data

(60) Provisional application No. 61/346,368, filed on May 19, 2010.

(51) Int. Cl.
*B01D 15/32* (2006.01)
*B01J 20/287* (2006.01)
*B01J 20/32* (2006.01)
*B01J 20/289* (2006.01)

(52) U.S. Cl.
CPC ............ *B01D 15/327* (2013.01); *B01J 20/287* (2013.01); *B01J 20/289* (2013.01); *B01J 20/3204* (2013.01); *B01J 20/3208* (2013.01); *B01J 20/3219* (2013.01); *B01J 20/3259* (2013.01); *B01J 20/3263* (2013.01); *B01J 20/3265* (2013.01); *B01J 2220/82* (2013.01)

(58) Field of Classification Search
CPC .. B01D 15/327; B01J 20/287; B01J 20/3204; B01J 20/3219; B01J 20/289; B01J 20/3208; B01J 20/3263; B01J 20/3265; B01J 20/3259; B01J 2220/82

USPC ............ 210/635, 656, 198.2, 502.1; 502/401
See application file for complete search history.

(56) References Cited

U.S. PATENT DOCUMENTS 4,177,038 A * 12/1979 Biebricher et al. ............... 8/192
4,351,909 A    9/1982 Stevens
4,382,124 A    5/1983 Meitzner et al.
(Continued)

FOREIGN PATENT DOCUMENTS

WO    WO03022433 A2    3/2003
WO    WO2005047886 A1    5/2005
WO    WO2006088760 A1    8/2006

OTHER PUBLICATIONS

Horak, J., N.M. Maier, W. Lindner. Investigations on the chromatographic behavior of hybrid reversed-phase materials containing electron donor-acceptor systems II. Contribution of pi-pi aromatic interactions. J. Chromatogr. A 1045:43-58 (2004).*

(Continued)

*Primary Examiner* — Ernest G Therkorn
(74) *Attorney, Agent, or Firm* — Gregory Ellis

(57) ABSTRACT

The current invention provides compositions, which are useful as stationary phases for a variety of chromatographic applications, such as high performance liquid chromatography (HPLC) and solid-phase extraction (SPE). The compositions provide both strong aromatic and hydrophobic interactions with components of a sample. Moreover, the invention provides compositions of new silanes, their immobilization on a solid substrate, such as silica, to form new stationary phases.

16 Claims, 17 Drawing Sheets

(56) References Cited

U.S. PATENT DOCUMENTS

| | | | |
|---|---|---|---|
| 4,383,047 A | | 5/1983 | Stevens et al. |
| 4,519,905 A | | 5/1985 | Stevens et al. |
| 4,604,207 A | * | 8/1986 | Oi et al. ............ 210/635 |
| 4,927,539 A | | 5/1990 | Stevens et al. |
| 5,130,343 A | | 7/1992 | Frechet et al. |
| 5,260,094 A | | 11/1993 | Giannelis et al. |
| 5,334,310 A | | 8/1994 | Frechet et al. |
| 5,453,185 A | | 9/1995 | Frechet et al. |
| 5,489,387 A | * | 2/1996 | Namikoshi et al. ............ 210/635 |
| 5,532,279 A | | 7/1996 | Barretto et al. |
| 5,728,457 A | | 3/1998 | Frechet et al. |
| 5,759,404 A | * | 6/1998 | Ericsson et al. ............ 210/638 |
| 5,865,994 A | | 2/1999 | Riviello et al. |
| 5,925,253 A | | 7/1999 | Pohl et al. |
| 5,929,214 A | | 7/1999 | Peters et al. |
| 5,936,003 A | | 8/1999 | Pohl et al. |
| 5,968,363 A | | 10/1999 | Riviello et al. |
| 6,528,167 B2 | | 3/2003 | O'Gara |
| 6,887,384 B1 | | 5/2005 | Frechet et al. |
| 7,074,331 B2 | | 7/2006 | Allington et al. |
| 7,303,671 B2 | | 12/2007 | Srinivasan et al. |
| 8,202,417 B2 | * | 6/2012 | Vinkovic et al. ............ 210/198.2 |
| 2006/0054559 A1 | | 3/2006 | Liu et al. |
| 2006/0070937 A1 | | 4/2006 | Rustamov et al. |
| 2006/0180549 A1 | * | 8/2006 | Liu et al. ............ 210/656 |
| 2007/0181502 A1 | * | 8/2007 | Johnson et al. ............ 210/656 |
| 2008/0164211 A1 | * | 7/2008 | Lindner et al. ............ 210/656 |
| 2008/0203027 A1 | * | 8/2008 | Liu et al. ............ 210/656 |
| 2009/0036537 A1 | * | 2/2009 | Raymond et al. ............ 514/616 |

OTHER PUBLICATIONS

Akiyama, S. et al. Development of 3-(N-substituted)aminopropylsilyl silica gels having π-electron systems and preliminary research on their use in high performance liquid chromatography. *Bunseki Kagaku* 42:817-823 (1993) and English-language translation of same.

Brindle, R.R., K. Albert. Stationary phases with chemically bonded fluorene ligands: a new approach for environmental analysis of π-electron containing solutes. *J. Chromatogr. A* 757:3 (1997).

Dondi, F., Y.D. Kahie. Solvent selectivity effects in reversed-phase high-performance liquid chromatography of flavonoid compounds. *J. Chromatogr.* 461:281 (1989).

Goss, J.D. Improved liquid chromatography of salicylic acid and some related compounds on a phenyl column *J. Chromatogr. A* 828:267 (1998).

Grosse-Rhode, C., H.G. Kicinski, A. Kettrup. Comparison of two anthryl-modified silica stationary phases for the HPLC separation of PAHs and Nitro-PAHs. *Chromatographia* 29:489 (1990).

Horak, J., N.M. Maier, W. Lindner. Investigations on the chromatographic behavior of hybrid reversed-phase materials containing electron donor-acceptor systems II. Contribution of π-π aromatic interactions. *J. Chromatogr. A* 1045:43-58 (2004).

Ikada et al. Reaction of poly(vinyl alcohol) with potassium persulfate and graft copolymerization. *Journal of Polymer Science* vol. 12:1829-1839 (1974).

Kimata, K., T. Hirose, K. Mariachi, K. Kosoya, T. Araki, N. Tanaka. High-capacity stationary phases containing heavy atoms for HPLC separation of fullerenes *Anal. Chem.* 67:2556 (1995).

Locke, D.C., R. Dolfinger. Dependence of selectivity on eluent composition and temperature in the HPLC separation of taxanes using fluorinated and hydrocarbon phases. *Anal. Chem.* 75:1355 (2003).

Majors, R.E. Trends in HPLC Column Usage, LCGC North America, Nov. 1, 2009:956-972.

Marchand, D.H., K. Croes, J.W. Dolan, L.R. Snyder, R.A. Henry, K.M.R. Kallury, S. Waite, P.W. Carr. Column selectivity in reversed-phase liquid chromatography; VIII. phenylalkyl and fluoro-substituted columns. *J. Chromatogr. A* 1062:65 (2005).

Minakuchi, H. et al. Octadecylsilylated porous silica rods as separation media for reversed-phase liquid chromatography. *Anal. Chem.* 68:3498-3501.

Minakuchi, H. et al. Effect of domain size on the performance of octadecylsilylated continuous porous silica columns in reversed-phase liquid chromatography. *J. Chromatogr* 797:121-131 (1998).

Nakashima, K. et al. Use of 3-(1,8-naphthalimido)propyl-modified silyl silica gel as a stationary phase for the high-performance liquid chromatography separation of purine derivatives. *J. Chromatogr. A* 722:107-113 (1996).

Richhemier, S.L., M.C. Kent, M.W. Bernat. Reversed-phase high-performance liquid chromatographic method using a pentafluorophenyl bonded phase for analysis of tocopherols *J Chromatogr. A* 677:75 (1994).

Rostagno, M. Monolithic columns for fast high-performance liquid chromatography separations. *SciTopics*, Feb. 14, 2009:1-4 (ISR Ref XP55005547).

Tanaka, N., Y. Okuda, K. Iwaguchi, M. Araki. Effect of stationary phase structure on retention and selectivity in reversed-phase liquid chromatography *J. Chromatogr.* 239:761 (1982).

Zhou, L., Y. Wu, B.D. Johnson, J.M. Syvratt. Chromatographic separation of 3,4-difluorophenylacetic acid and its positional isomers using five different techniques. *J.Chromatogr. A* 866:281 (2000).

* cited by examiner

Column: 4.6x150 mm, 3 μm
Mobile Phase: CH$_3$OH/H$_2$O v/v 80/20
Temperature: 40°C
Flow Rate: 1 mL/min
Inj. Volume: 5 μL
Detection: UV (254 nm)
Peaks: 1. Uracil (void marker)
2. o-Terphenyl 3. Triphenylene

FUNCTIONALIZED SUBSTRATES WITH AROMATIC STACKING PROPERTIES

CROSS-REFERENCE TO RELATED APPLICATIONS

This application claims priority to U.S. Provisional Patent Application Ser. No. 61/346,368, filed on May 19, 2010, the disclosure of which is incorporated herein by reference in its entirety for all purposes.

FIELD OF THE INVENTION

This invention relates to compositions useful as stationary phases for chromatographic applications and methods of making and using the compositions.

BACKGROUND OF THE INVENTION

Selectivity is an important factor for a successful chromatographic separation. Common stationary phases for liquid chromatography, such as reversed-phase (RP), ion-exchange (IEX) and normal phase (NP) chromatography are frequently characterized by limited selectivity necessitating multiple analyses for a single sample.

Reversed-phase (RP) stationary phases for liquid chromatography (LC) are both popular and commercially available. In recent years, stationary phases containing a phenyl type functionality have been introduced and are widely used. A recent report indicates that 35% of all RPLC analyses employed C18 phases and 19% used phenyl-type phases (Ronald E. Majors, Trends in HPLC Column Usage, LCGC North America, Nov. 1, 2009, pp 956-972). The increased popularity of phenyl phases results from their unique chromatographic selectivity complimentary to alkyl-type phases (e.g., C18) in method developments because of their capacity to participate in aromatic interaction with aromatic solutes.

Phenyl bonded phases have been successfully used to resolve positional isomers (L. Zhou, Y. Wu, B. D. Johnson, J. M. Wyvratt, *J. Chromatogr. A* 866 (2000), p. 281), tocopherols (S. L. Richhemier, M. C. Kent, M. W. Bernat, *J. Chromatogr. A* 677 (1994), p. 75), flavonoids (F. Dondi, Y. D. Kahie, J. Chromatogr. 461 (1989), p. 281), taxols (D. C. Locke, R. Dolfinger, *Anal. Chem.* 75 (2003), p. 1355), polynuclear aromatics and nitroaromatic compounds (D. H. Marchand, K. Croes, J. W. Dolan, L. R. Snyder, R. A. Henry, K. M. R. Kallury, S. Waite, P. W. Carr, *J. Chromatogr. A* 1062 (2005), p. 65), active pharmaceutical ingredient and related compounds (D. H. Marchand, K. Croes, J. W. Dolan, L. R. Snyder, R. A. Henry, K. M. R. Kallury, S. Waite, P. W. Carr, *J. Chromatogr. A* 1062 (2005), p. 65).

Although there are a number of commercial phenyl-type phases in the market, all of them have at least one of the following drawbacks that prevent them from broad application: low hydrophobic retention, inadequate shape selectivity for analytes, and incompatibility with highly aqueous mobile phases. The most common commercial phenyl columns contain a phenyl ligand with a short alkyl linker covalently bound to the silica surface, however, due to the short alkyl linker, these columns usually lack sufficient hydrophobic retention and exhibit low hydrolytic stability.

A great deal of research has been done to prepare stationary phases containing various aromatic groups, such as phenyl (J. D. Goss, *J. Chromatogr. A* 828 (1998), p. 267), pyrenyl (K. Kimata, T. Hirose, K. Mariachi, K. Kosoya, T. Araki, N. Tanaka, *Anal. Chem.* 67 (1995), p. 2556 and N. Tanaka, Y. Okuda, K. Iwaguchi, M. Araki, *J. Chromatogr.* 239 (1982), p. 761), naphthenyl (N. Tanaka, Y. Okuda, K. Iwaguchi, M. Araki, *J. Chromatogr.* 239 (1982), p. 761), fluorenyl (R. R. Brindle, K. Albert, *J. Chromatogr. A* 757 (1997), p. 3), anthracenyl (C. Grosse-Rhode, H. G. Kicinski, A. Kettrup, *Chromatographia* 29 (1990), p. 489) and naphthalimide (J. Horak, N. M. Maier, W. Lindner, *J. Chromatogr. A* 1045 (2004), p. 43).

Nakashima et al. used a packing material, 3-(1,8-naphthalimido)propyl-modified silyl silica gel, as a stationary phase for high-performance liquid chromatography. It was reported that this material behaved like a reversed-phase stationary phase with some $\pi$-$\pi$ interaction, and was used to separate purine derivatives, i.e., xanthine, hypoxanthine, uric acid, theobromine, theophylline and caffeine (K. Nakashima et al. *J. Chromatogr. A* 722 (1996), pp. 107-113). However, due to the short alkyl linker, hydrophobic retention is too low for broad application when a reverse phase modality is desired. In addition, the synthetic route used by Nakashima et al. involved a two-step reaction, resulting in undesirable $\pi$-$\pi$ interaction or aromatic stacking interaction and an anion-exchange "mixed-mode" material. This synthetic route also provided only a low bonding density of the organic ligands, leading to low shape selectivity and low hydrolytic stability.

J. Horak et al. reported preparation and chromatographic evaluation data of three naphthalimide-type stationary phases (J. Horak et al. *J. Chromatogr. A* 1045 (2004), pp. 43-58). These phases consisted of a naphthalimide end-group to provide an aromatic stacking interaction and a long alkyl spacer with a thiol ether linkage. They reported that the presence of electron donor/acceptor moieties within a reversed phase system not only increased the overall retention times for aromatic solutes, but also led to an enhanced shape selectivity of the hybrid stationary phase. However, these phases have quite a few drawbacks. Firstly, thiol and thiol ether groups are not stable, and are subject to oxidation and/or cleavage under acidic conditions. Thus, they are not viable chromatographic packing materials. Secondly, the synthesis involves free radical addition between $R^1$—SH and $CH_2$=CH—$R^2$, generating an undesirably complex mixed-mode surface, including an aromatic interaction moiety, a thiol ether and unreacted thiol groups. Furthermore, due to steric hindrance, the reported synthetic approach produces very low bonding density (1.08 to 1.73 μmol/m$^2$). Low bonding density has adverse effects on chromatographic properties, including low shape selectivity, low hydrophobic retention and low hydrolytic stability Most high surface coverage reversed-phase columns are not compatible with highly aqueous mobile phases, suffering from sudden retention time loss (a phenomenon often referred to as stationary phase de-wetting or phase collapse) after interrupting mobile phase flow. An exemplary solution to this problem is the use of polar-end-capping or the incorporation of polar groups, including amide, sulfonamide, carbamate, or urea groups in the alkyl chain. However, phenyl-type phases have lower hydrophobic retention compared to their alkyl-type counterpart with the same number of carbon atoms and adding a polar group further exacerbates this problem. Thus it's only by combining all three components (i.e., a longer, more hydrophobic linker, a polar group and an aromatic moiety fused to the polar group that a useful aromatic interaction stationary phase with reverse phase properties, which is compatible with highly aqueous mobile phases can be prepared. The present invention provides stationary phases having such properties.

SUMMARY OF THE INVENTION

The current invention provides compositions, which are useful as stationary phases for a variety of chromatographic applications, such as liquid chromatography (LC) (e.g., high performance liquid chromatography (HPLC)) and solid phase extraction (SPE). The stationary phases of the invention provide strong aromatic interaction and a high level of hydrophobic retention.

Hydrophobic retention is one of the most important and highly desired properties for a broad range of HPLC applications. It is not an exception for phenyl-type columns. However, one would expect that longer alkyl chains would increase retention but decrease the component of the retention that was related to aromatic stacking interactions, namely steric selectivity and aromatic selectivity. As demonstrated in this invention, the inverse of what is expected is actually the case—the longer alkyl chain resulted in a high level of hydrophobic retention, shape selectivity and aromatic selectivity, all at the same time. While not being bound to any theory or principal of operation, the inventors believe that the aromatic moieties, perhaps by interaction of π-electron clouds, interact more strongly in a low dielectric environment which is created by the combination of having a longer, more hydrophobic linker and an aromatic, e.g., a phthalimide moiety.

In an exemplary embodiment, the present invention provides new HPLC packing materials with both strong aromatic interaction and a high level of hydrophobic retention. More particularly, this invention concerns the synthesis of new silanes, their immobilization on silica, and the use of the resulting phases in liquid chromatography.

The present invention provides numerous advantages over prior chromatographic stationary phases. For example, the long alkyl chain (e.g., linker between solid substrate and imidyl moiety C8 or greater) provides higher hydrophobic retention than current aromatic interaction stationary phases, and excellent hydrolytic stability. The combination of a cyclic, planar aromatic imidyl moiety provides strong aromatic interaction, and the imidyl moiety is fully compatible with highly aqueous mobile phases.

Thus, the present invention provides novel stationary phases combining an aromatic moiety (e.g., phenyl or phenyl fused with another ring) having high aromatic selectivity, high hydrophobic retention, unique and complementary selectivity, and compatibility with highly aqueous mobile phases. The invention provides high efficiency and rugged packing.

In an exemplary embodiment, the composition of the invention includes a ligand that comprises a aromatic imidyl moiety (e.g., phthalamidyl) and a linker having at least eight adjacent carbon atoms provides an optimal bonding density of the ligand on the solid support, providing a medium with a high degree of steric selectivity and shape selectivity for differently shaped aromatic analytes. See, e.g., *J. Chromatogr. A* 1045 (2004) 43-58).

Furthermore, the invention provides a method of preparing the stationary phase which is versatile, robust and straightforward, providing materials with uniformity and chemical stability superior to existing chromatographic stationary phases. The method includes: (a) providing a solid support (e.g., inorganic solid support, such as silica gel or silica monolith; or an organic polymeric solid support, such as polystyrene-divinylbenzene co-polymer) having an exterior surface and interior walls defining interior pores extending to openings in the exterior surface; and (b) covalently bonding organic ligands to the exterior and interior surfaces of the solid support, for example, via reactive functional groups on the surface of the solid support and/or the ligand. The ligands include at least one aromatic stacking group.

The current invention further provides a composition of the invention in a flow-through bed suitable for use as a chromatographic medium. In addition, the invention provides a chromatography column including a composition of the invention. The invention further provides a chromatography column packed with a separation medium including a composition of the invention.

The current invention further provides a chromatographic method (e.g., for separating analytes in a liquid sample) that involves flowing a liquid through a bed (e.g., packed bed or monolith) of a separation medium that includes a composition of the invention. In one example, the liquid (i.e. mobile phase) is a primarily aqueous medium, optionally including an organic solvent. Exemplary chromatographic methods include the separation of aromatic analytes, separation of glucocorticosteroids, separation of phospholipids separation of steroid hormones, e.g., estrogens and separation of fat-soluble vitamins.

Additional aspects, objects and embodiments of the present invention are apparent from the detailed description below.

DETAILED DESCRIPTION OF THE INVENTION

I. Definitions

Figure 1:
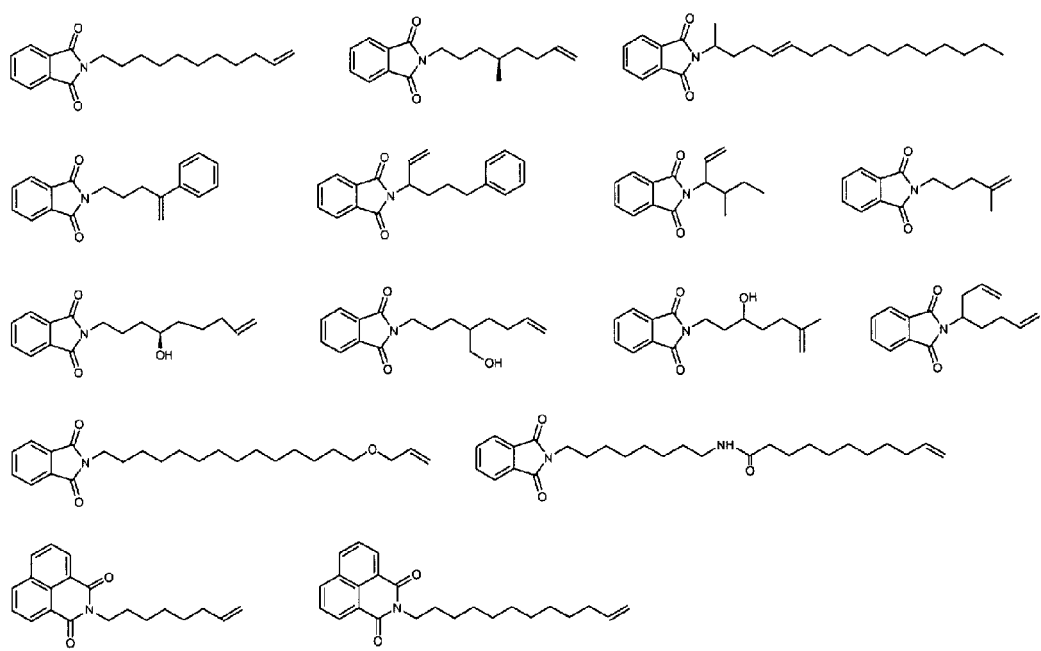
FIG. 1 is a table of exemplary aromatic groups of use in exemplary ligands and stationary phases of the invention.
Figure 2:
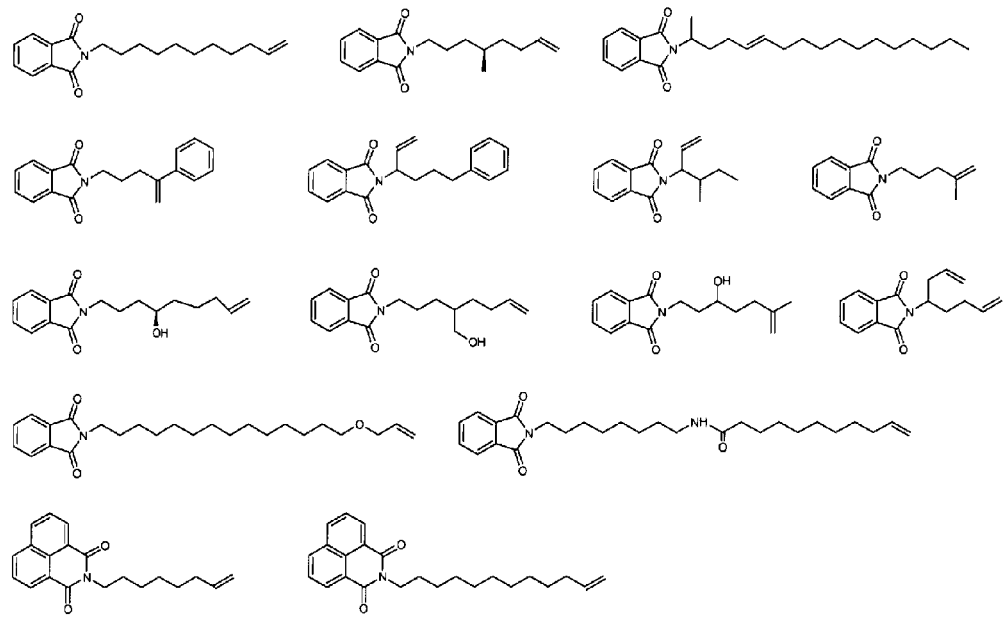
FIG. 2 is a table of exemplary allyl precursors for exemplary ligands and stationary phases of the invention.
Figure 3:
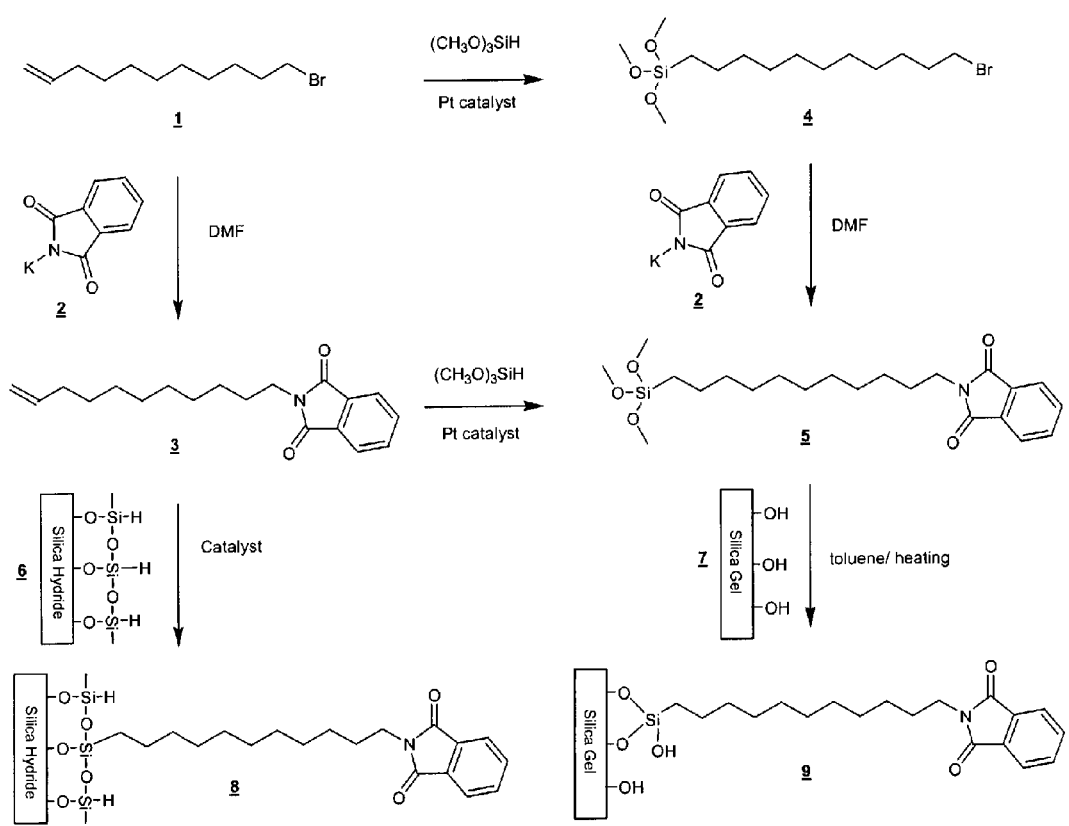
FIG. 3 is an exemplary synthetic route to exemplary stationary phases of the invention.

Where substituent groups are specified by their conventional chemical formulae, written from left to right, they optionally equally encompass the chemically identical substituents, which would result from writing the structure from right to left, e.g., —CH$_2$O— is intended to also recite —OCH$_2$—.

The term "alkyl," by itself or as part of another substituent, means, unless otherwise stated, a straight or branched chain, or cyclic hydrocarbon radical, or combination thereof, which may be fully saturated, mono- or polyunsaturated and can include di- and multivalent radicals, having the number of carbon atoms designated (i.e. C$_1$-C$_{10}$ means one to ten carbons). Examples of saturated hydrocarbon radicals include, but are not limited to, groups such as methyl, ethyl, n-propyl (e.g., —CH$_2$—CH$_2$—CH$_3$, —CH$_2$—CH$_2$—CH$_2$—), isopropyl, n-butyl, t-butyl, isobutyl, sec-butyl, cyclohexyl, (cyclohexyl)methyl, cyclopropylmethyl, homologs and isomers of, for example, n-pentyl, n-hexyl, n-heptyl, n-octyl, and the like. An unsaturated alkyl group is one having one or more double bonds or triple bonds. Examples of unsaturated alkyl groups include, but are not limited to, vinyl, 2-propenyl, crotyl, 2-isopentenyl, 2-(butadienyl), 2,4-pentadienyl, 3-(1,4-pentadienyl), ethynyl, 1- and 3-propynyl, 3-butynyl, and the higher homologs and isomers. The term "alkyl," unless otherwise noted, is also optionally meant to include those derivatives of alkyl defined in more detail below, such as "heteroalkyl." Alkyl groups that are limited to hydrocarbon groups are termed "homoalkyl". The term "alkyl" can also mean "alkylene" or "alkyldiyl" as well as alkylidene in those cases where the alkyl group is a divalent radical.

The term "alkylene" or "alkyldiyl" by itself or as part of another substituent means a divalent radical derived from an alkyl group, as exemplified, but not limited, by —CH$_2$CH$_2$CH$_2$— (propylene or propane-1,3-diyl), and further includes those groups described below as "heteroalkylene." Typically, an alkyl (or alkylene) group will have from 1 to about 30 carbon atoms, preferably from 1 to about 25 carbon atoms, more preferably from 1 to about 20 carbon atoms, even more preferably from 1 to about 15 carbon atoms and most preferably from 1 to about 10 carbon atoms. A "lower alkyl", "lower alkylene" or "lower alkyldiyl" is a shorter chain alkyl, alkylene or alkyldiyl group, generally having about 10 or fewer carbon atoms, about 8 or fewer carbon atoms, about 6 or fewer carbon atoms or about 4 or fewer carbon atoms.

The term "alkylidene" by itself or as part of another substituent means a divalent radical derived from an alkyl group, as exemplified, but not limited, by CH$_3$CH$_2$CH$_2$=(propylidene). Typically, an alkylidene group will have from 1 to about 30 carbon atoms, preferably from 1 to about 25 carbon atoms, more preferably from 1 to about 20 carbon atoms, even more preferably from 1 to about 15 carbon atoms and most preferably from 1 to about 10 carbon atoms. A "lower alkyl" or "lower alkylidene" is a shorter chain alkyl or alkylidene group, generally having about 10 or fewer carbon atoms, about 8 or fewer carbon atoms, about 6 or fewer carbon atoms or about 4 or fewer carbon atoms.

The terms "alkoxy," "alkylamino" and "alkylthio" (or thioalkoxy) are used in their conventional sense, and refer to those alkyl groups attached to the remainder of the molecule via an oxygen atom, an amino group, or a sulfur atom, respectively.

The term "heteroalkyl," by itself or in combination with another term, means, unless otherwise stated, a stable straight or branched chain, or cyclic hydrocarbon radical, or combinations thereof, consisting of the stated number of carbon atoms and at least one heteroatom selected from the group consisting of O, N, Si, S and B, and wherein the nitrogen and sulfur atoms may optionally be oxidized and the nitrogen heteroatom may optionally be quaternized. The heteroatom(s) O, N, B, S and Si may be placed at any interior position of the heteroalkyl group or at the position at which the alkyl group is attached to the remainder of the molecule. Examples include, but are not limited to, —CH$_2$—CH$_2$—O—CH$_3$, —CH$_2$—CH$_2$—NH—CH$_3$, —CH$_2$—CH$_2$—N(CH$_3$)—CH$_3$, —CH$_2$—S—CH$_2$—CH$_3$, —CH$_2$—CH$_2$, —S(O)—CH$_3$, —CH$_2$—CH$_2$—S(O)$_2$—CH$_3$, —CH=CH—O—CH$_3$, —Si(CH$_3$)$_3$, —CH$_2$—CH=N—OCH$_3$, and —CH=CH—N(CH$_3$)—CH$_3$. Up to two heteroatoms may be consecutive, such as, for example, —CH$_2$—NH—OCH$_3$ and —CH$_2$—O—Si(CH$_3$)$_3$. Similarly, the term "heteroalkylene" by itself or as part of another substituent means a divalent radical derived from heteroalkyl, as exemplified, but not limited by, —CH$_2$—CH$_2$—S—CH$_2$—CH$_2$— and —CH$_2$—S—CH$_2$—CH$_2$—NH—CH$_2$—. For heteroalkylene groups, heteroatoms can also occupy either or both of the chain termini (e.g., alkyleneoxy, alkylenedioxy, alkyleneamino, alkylenediamino, and the like). Still further, for alkylene and heteroalkylene linking groups, no orientation of the linking group is implied by the direction in which the formula of the linking group is written. For example, the formula —CO$_2$R'— represents both —C(O)OR' and —OC(O)R'.

The terms "cycloalkyl" and "heterocycloalkyl", by themselves or in combination with other terms, represent, unless otherwise stated, cyclic versions of "alkyl" and "heteroalkyl", respectively. Additionally, for heterocycloalkyl, a heteroatom can occupy the position at which the heterocycle is attached to the remainder of the molecule. Examples of cycloalkyl include, but are not limited to, cyclopentyl, cyclohexyl, 1-cyclohexenyl, 3-cyclohexenyl, cycloheptyl, and the like. Examples of heterocycloalkyl include, but are not limited to, 1-(1,2,5,6-tetrahydropyridyl), 1-piperidinyl, 2-piperidinyl, 3-piperidinyl, 4-morpholinyl, 3-morpholinyl, tetrahydrofuran-2-yl, tetrahydrofuran-3-yl, tetrahydrothien-2-yl, tetrahydrothien-3-yl, 1-piperazinyl, 2-piperazinyl, and the like.

The terms "halo" or "halogen," by themselves or as part of another substituent, mean, unless otherwise stated, a fluorine, chlorine, bromine, or iodine atom. Additionally, terms such as "haloalkyl," are meant to include monohaloalkyl and polyhaloalkyl. For example, the term "halo(C$_1$-C$_4$)alkyl" is mean to include, but not be limited to, trifluoromethyl, 2,2,2-trifluoroethyl, 4-chlorobutyl, 3-bromopropyl, and the like.

The term "aryl" means, unless otherwise stated, a polyunsaturated, aromatic, substituent that can be a single ring or multiple rings (preferably from 1 to 3 rings), which are fused together or linked covalently. The term "heteroaryl" refers to aryl groups (or rings) that contain from one to four heteroatoms selected from N, O, S, Si and B, wherein the nitrogen and sulfur atoms are optionally oxidized, and the nitrogen atom(s) are optionally quaternized. A heteroaryl group can be attached to the remainder of the molecule through a heteroatom. Non-limiting examples of aryl and heteroaryl groups include phenyl, 1-naphthyl, 2-naphthyl, 4-biphenyl, 1-pyrrolyl, 2-pyrrolyl, 3-pyrrolyl, 3-pyrazolyl, 2-imidazolyl, 4-imidazolyl, pyrazinyl, 2-oxazolyl, 4-oxazolyl, 2-phenyl-4-oxazolyl, 5-oxazolyl, 3-isoxazolyl, 4-isoxazolyl, 5-isoxazolyl, 2-thiazolyl, 4-thiazolyl, 5-thiazolyl, 2-furyl, 3-furyl, 2-thienyl, 3-thienyl, 2-pyridyl, 3-pyridyl, 4-pyridyl, 2-pyrimidyl, 4-pyrimidyl, 5-benzothiazolyl, purinyl, 2-benzimidazolyl, 5-indolyl, 1-isoquinolyl, 5-isoquinolyl, 2-quinoxalinyl, 5-quinoxalinyl, 3-quinolyl, and 6-quinolyl. Substituents for each of the above noted aryl and heteroaryl ring systems are selected from the group of acceptable substituents described below.

For brevity, the term "aryl" when used in combination with other terms (e.g., aryloxy, arylthioxy, arylalkyl) optionally includes both aryl and heteroaryl rings as defined above. Thus, the term "arylalkyl" is meant to include those radicals in which an aryl group is attached to an alkyl group (e.g., benzyl, phenethyl, pyridylmethyl and the like) including those alkyl groups in which a carbon atom (e.g., a methylene group) has been replaced by, for example, an oxygen atom (e.g., phenoxymethyl, 2-pyridyloxymethyl, 3-(1-naphthyloxy)propyl, and the like).

Each of the above terms (e.g., "alkyl," "heteroalkyl," "aryl" and "heteroaryl") are meant to include both substituted and unsubstituted forms of the indicated radical. Preferred substituents for each type of radical are provided below.

Substituents for the alkyl and heteroalkyl radicals (including those groups often referred to as alkylene, alkenyl, heteroalkylene, heteroalkenyl, alkynyl, cycloalkyl, heterocycloalkyl, cycloalkenyl, and heterocycloalkenyl) are generically referred to as "alkyl group substituents," and they can be one or more of a variety of groups selected from, but not limited to: substituted or unsubstituted aryl, substituted or unsubstituted heteroaryl, substituted or unsubstituted heterocycloalkyl, —OR', =O, =NR', =N—OR', —NR'R", —SR', —halogen, —SiR'R"R'", —OC(O)R', —C(O)R', —CO$_2$R', —CONR'R", —OC(O)NR'R", —NR"C(O)R', —NR'—C(O)NR"R'", —NR"C(O)$_2$R', —NR—C(NR'R"R'")=NR"", —NR—C(NR'R")=NR'", —S(O)R', —S(O)$_2$R', —OS(O)$_2$R', —S(O)$_2$NR'R", —NRSO$_2$R', —CN and —NO$_2$ in a number ranging from zero to (2 m'+1), where m' is the total number of carbon atoms in such radical. R', R", R'" and R"" each preferably independently refer to hydrogen, substituted or unsubstituted heteroalkyl, substituted or unsubstituted aryl, e.g., aryl substituted with 1-3 halogens, substituted or unsubstituted alkyl, alkoxy or thioalkoxy groups, or arylalkyl groups. When a compound of the invention includes more than one R group, for example, each of the R groups is independently selected as are each R', R", R'" and R"" groups when more than one of these groups is present. When R' and R" are attached to the same nitrogen atom, they can be combined with the nitrogen atom to form a 5-, 6-, or 7-membered ring. For example, —NR'R" is meant to include, but not be limited to, 1-pyrrolidinyl and 4-morpholinyl. From the above discussion of substituents, one of skill in the art will understand that the term "alkyl" is meant to include groups including carbon atoms bound to groups other than hydrogen groups, such as haloalkyl (e.g., —CF$_3$ and —CH$_2$CF$_3$) and acyl (e.g., —C(O)CH$_3$, —C(O)CF$_3$, —C(O)CH$_2$OCH$_3$, and the like).

Similar to the substituents described for the alkyl radical, substituents for the aryl and heteroaryl groups are generically referred to as "aryl group substituents." The substituents are selected from, for example: substituted or unsubstituted alkyl, substituted or unsubstituted aryl, substituted or unsubstituted heteroaryl, substituted or unsubstituted heterocycloalkyl, —OR', =O, =NR', =N—OR', —NR'R", —SR', -halogen, —SiR'R"R'", —OC(O)R', —C(O)R', —CO$_2$R', —CONR'R", —OC(O)NR'R", —NR"C(O)R', —NR'—C(O)NR"R'", —NR"C(O)$_2$R', —NR—C(NR'R"R'")=NR"", —NR—C(NR'R")=NR'", —S(O)R', —S(O)$_2$R', —S(O)$_2$NR'R", —NRSO$_2$R', —CN and —NO$_2$, —R', —N$_3$, —CH(Ph)$_2$, fluoro(C$_1$-C$_4$)alkoxy, and fluoro(C$_1$-C$_4$)alkyl, in a number ranging from zero to the total number of open valences on the aromatic ring system; and where R', R", R'" and R"" are preferably independently selected from hydrogen, substituted or unsubstituted alkyl, substituted or unsubstituted heteroalkyl, substituted or unsubstituted aryl and substituted or unsubstituted heteroaryl. When a compound of the invention includes more than one R group, for example, each of the R groups is independently selected as are each R', R", R'" and R"" groups when more than one of these groups is present.

Two of the substituents on adjacent atoms of the aryl or heteroaryl ring may optionally be replaced with a substituent of the formula -T-C(O)—(CRR')$_q$—U—, wherein T and U are independently —NR—, —O—, —CRR'— or a single bond, and q is an integer of from 0 to 3. Alternatively, two of the substituents on adjacent atoms of the aryl or heteroaryl ring may optionally be replaced with a substituent of the formula -A-(CH$_2$)$_r$—B—, wherein A and B are independently —CRR'—, —O—, —NR—, —S—, —S(O)—, —S(O)$_2$—, —S(O)$_2$NR'— or a single bond, and r is an integer of from 1 to 4. One of the single bonds of the new ring so formed may optionally be replaced with a double bond. Alternatively, two of the substituents on adjacent atoms of the aryl or heteroaryl ring may optionally be replaced with a substituent of the formula —(CRR')$_s$—X—(CR"R'")$_d$—, where s and d are independently integers of from 0 to 3, and X is —O—, —NR'—, —S—, —S(O)—, —S(O)$_2$—, or —S(O)$_2$NR'—. The substituents R, R', R" and R'" are preferably independently selected from hydrogen or substituted or unsubstituted (C$_1$-C$_6$)alkyl.

As used herein, the term "silyl group substituent" can be one or more of a variety of groups selected from, but not limited to: substituted or unsubstituted alkyl, substituted or unsubstituted heteroalkyl, substituted or unsubstituted aryl, substituted or unsubstituted heteroaryl, substituted or unsubstituted heterocycloalkyl, acyl, —OR', —NR'R", —SR', -halogen, —SiR'R"R'", —OC(O)R', —C(O)R', —CO$_2$R', —CONR'R", —OC(O)NR'R", —NR"C(O)R', —NR'—C(O)NR"R'", —NR"C(O)$_2$R', —NR—C(NR'R"R'")=NR"", —NR—C(NR'R")=NR'", —S(O)R', —S(O)$_2$R', —OS(O)$_2$R', —S(O)$_2$NR'R", —NRSO$_2$R', —CN and —NO$_2$. R', R", R'" and R"" each preferably independently refer to hydrogen, substituted or unsubstituted heteroalkyl, substituted or unsubstituted aryl, e.g., aryl substituted with 1-3 halogens, substituted or unsubstituted alkyl, alkoxy or thioalkoxy groups, or arylalkyl groups. When a compound of the invention includes more than one R group, for example, each of the R groups is independently selected as are each R', R", R'" and R"" groups when more than one of these groups is present. When R' and R" are attached to the same nitrogen atom, they can be combined with the nitrogen atom to form a 5-, 6-, or 7-membered ring. For example, —NR'R" is meant to include, but not be limited to, 1-pyrrolidinyl and 4-morpholinyl. From the above discussion of substituents, one of skill in the art will understand that the term "alkyl" is meant to include groups including carbon atoms bound to groups other than hydrogen groups, such as haloalkyl (e.g., —CF$_3$ and —CH$_2$CF$_3$) and acyl (e.g., —C(O)CH$_3$, —C(O)CF$_3$, —C(O)CH$_2$OCH$_3$, and the like).

As used herein, the term "non-reactive silyl group substituent" means a "silyl group substituent" that does not react with a substrate of the invention to form a covalent bond between the silyl group substituent and the substrate. Exemplary "non-reactive silyl group substituents" include alkyl (e.g., methyl, ethyl, propyl, butyl and other lower alkyl groups) or aryl groups (e.g., phenyl).

As used herein, the term "reactive silyl group substituent" means a "silyl group substituent" that is capable of reacting with a substrate of the invention to form a covalent bond between the silyl group substituent and the substrate. Exemplary "reactive silyl group substituents" include those groups that are conventionally defined as leaving groups, such as halogens (e.g., Cl and Br). Other exemplary "reactive silyl group substituents" include alkoxy groups (e.g., methoxy or ethoxy) and primary and secondary amino groups.

As used herein, the term "acyl" describes a substituent containing a carbonyl residue, C(O)R. Exemplary species for R include H, halogen, substituted or unsubstituted alkyl, substituted or unsubstituted hetroalkyl, substituted or unsubstituted aryl, substituted or unsubstituted heteroaryl, and substituted or unsubstituted heterocycloalkyl.

As used herein, the term "fused ring system" means at least two rings, wherein each ring has at least 2 atoms in common with another ring. "Fused ring systems may include aromatic as well as non aromatic rings. Examples of "fused ring systems" are naphthalenes, indoles, quinolines, chromenes and the like.

As used herein, the term "heteroatom" includes oxygen (O), nitrogen (N), sulfur (S), silicon (Si) and boron (B).

The symbol "R" is a general abbreviation that represents a substituent group that is selected from substituted or unsubstituted alkyl, substituted or unsubstituted heteroalkyl, substituted or unsubstituted aryl, substituted or unsubstituted heteroaryl, and substituted or unsubstituted heterocycloalkyl groups.

As used herein, the term "linker" describes a moiety interposed between the aromatic stacking, e.g., an imidyl, moiety and the substrate. The linker optionally includes internal ionic, ionizable or polar groups. Exemplary polar, ionic and ionizable groups are described herein. Exemplary polar groups include ether groups, amide groups, sulfonamide groups, urea groups, carbamate groups, carbonate groups and the like. An exemplary linker moiety includes a carbon chain having a number of carbon atoms in sequence, wherein this number is defined by a lower and/or an upper limit. With respect to the lower limit the linker has at least 6, at least 7, at least 8, at least 9, at least 10, at least 11, at least 12, at least 13, at least 14, at least 15, at least 16, at least 17, at least 18, at least 19, or at least 20 carbon atoms in sequence. With respect to the higher limit, the linker moiety includes preferably not more than about 50 carbon atoms in sequence, not more than about 30 carbon atoms, not more than about 25 carbon atoms, not more than about 20 carbon atoms, not more than about 15 carbon atoms, not more than about 14, not more than about 13, not more than about 12, not more than about 11, not more than about 10, not more than about 9 or not more than about 8 carbon atoms in sequence. Exemplary ranges for the number of carbon atoms in sequence may be formed between any of the above described higher and lower limits. In a particular embodiment, a hydrophobic moiety has at least 8 carbon atoms in sequence. In another embodiment, the linker moiety has at least 8 carbon atoms, but not more than 20 carbon atoms in sequence. Within the linker moiety, at least two of the carbon atoms in sequence are optionally part of a ring (e.g., a 5- or 6-membered ring), wherein the ring is a member selected from aryl, heteroaryl, cycloalkyl and a fused ring system that can include aryl, heteroaryl and cycloalkyl rings. The ring is optionally substituted, e.g., with a non-polar (hydrophobic) substituent, such as an unsubstituted alkyl group (e.g., methyl, ethyl or propyl group). In one example, the linker moiety exhibits reversed phase characteristics (e.g., at least $C_8$ alkyl).

As used herein, the term "ion-exchange group" refers to an ionic group or an ionizable group. Ionic groups are charged (e.g., positively charged quaternary amine), while ionizable groups can be charged or non-charged depending on the conditions to which the ionizable group is exposed (i.e., basic or acidic groups). For example, a tertiary amino group can be charged by accepting a proton (basic group) while a carboxylic acid group can be charged by donating a proton (acidic group). Ion-exchange groups include anion-exchange groups, cation-exchange groups, amphoteric and zwitterionic groups. Anion-exchange groups include primary, secondary, tertiary and quaternary amines, as well as any other basic (proton-accepting) functionalities. Cation-exchange groups include sulfonates, sulfates, carboxylates, phosphonates, phosphates, silanols, phenolic hydroxyl groups and any other acidic (proton-donating) functionalities. Amphoteric and zwitterionic ligands include at least one anion-exchange and at least one cation-exchange group, each of which can be selected from the above described ion-exchange groups. Exemplary stationary phases of the invention (e.g., the substrates, the ligands) are essentially free of ion-exchange groups, thereby avoiding a complex, multimodal separation mechanism.

As used herein, the terms "having a charge", "charged", "positively charged", "negatively charged" and any grammatical variation thereof, in connection with the stationary phases of the invention can mean incorporating "ionic" or "ionizable" groups.

The terms "substrate" and "support" or "solid support" are used interchangeably.

The term "essentially retained" refers to an analyte (e.g., an ion, an ionizable compound, an uncharged molecule and the like) and means that the analyte elutes from the separation medium after the void volume, e.g., giving rise to a peak with baseline separation from the solvent peak.

The terms "average diameter of the particle", "particle size", "average particle size", "median particle size", or any grammatical variation thereof refers to the particle size specification for a substrate (solid-support) of the invention. Particle-sizes are typically provided by the manufacturer. Particle sizes can refer to any type of particle including spherical and irregular-shaped particles.

As used herein "Acclaim Phenyl-1", refers to a chromatography column packed with stationary support 6 of the invention. An exemplary column is 3.0×250 mm.

Certain stationary phases of the present invention possess asymmetric carbon atoms (optical centers) or double bonds; the racemates, diastereomers, geometric isomers and individual isomers are encompassed within the scope of the present invention. Optically active (R)- and (S)-isomers may be prepared using chiral synthons or chiral reagents, or resolved using conventional techniques. When the compounds described herein contain olefinic double bonds or other centers of geometric asymmetry, and unless specified otherwise, it is intended that the compounds include both E and Z geometric isomers. Likewise, all tautomeric forms are also intended to be included.

The compounds of the present invention may also contain unnatural proportions of atomic isotopes at one or more of the atoms that constitute such compounds. For example, the compounds may be radiolabeled with radioactive isotopes, such as, for example, deuterium, tritium ($^3H$), iodine-125 ($^{125}I$) and carbon-14 ($^{14}C$). All isotopic variations of the compounds of the present invention, whether radioactive or not, are intended to be encompassed within the scope of the present invention.

II. Introduction

Phenyl-type phases are usually superior in enhancing interaction with aromatic compounds. The unique chemistry of the supports of the invention further expands aromatic interaction for unique selectivity while maintaining sufficient hydrophobic interaction and aqueous compatibility.

The current invention provides compositions with unique chromatographic properties, which are useful as stationary phases for a variety of chromatographic applications, such as high performance liquid chromatography (HPLC) and solid-phase extraction (SPE). In exemplary embodiments, the compositions of the invention include both reverse phase (RP) and aromatic stacking capabilities within the same chromatographic material.

The benefits of the stationary phases provided by this invention include:

1. The compositions provide unique selectivity. For example, the compositions can be used to retain and separate using reverse phase and aromatic stacking modalities within the same analysis.
3. The selectivity of the current compositions can be adjusted by changing the chemical composition of the aromatic stacking moiety or the linker.
4. The compositions are compatible with highly aqueous conditions (e.g., resistant to de-wetting in 100% aqueous conditions). See, e.g., FIG. 7.
5. The compositions are useful not only for making analytical separation columns, but also for developing new solid phase extraction (SPE) applications. Thus, the present invention provides a method of performing SPE (e.g., Accelerated Solvent Extraction (ASE)) using a composition of the invention. The method includes contacting a solid support of the invention with a sample, thereby adsorbing at least one component of the sample on the solid support; optionally removing at least one unadsorbed (or less strongly adsorbed) sample component and contacting the adsorbed sample component and the solid support with a solvent for the adsorbed sample, eluting the adsorbed sample component from the solid support.
7. The compositions can be blended with other chromatographic packing materials to produce a variety of novel packing materials for both separation and SPE columns.
8. The compositions can be prepared in a versatile, facile and economic manner. The amount of ligand, its linker length and composition and the identity of the aromatic stacking moiety are readily adjusted by using standard solid supports with different surface area and particle size, different ligand structures, and/or different surface chemistry to form the layer on the solid support.

III. Compositions

The present invention provides a composition including: (a) a solid support; and (b) organic ligands covalently bound to the solid support. In various examples, the ligands include a combination of a linker having reverse phase chromatographic properties and a group that interacts with (e.g., by stacking) aromatic analytes.

Exemplary solid supports and organic ligands useful in the compositions and methods of the invention are described hereinbelow.

Solid Support

The solid support (substrate) of the current invention can be any solid material and can optionally include pores (e.g., those useful as a stationary phase/packing material for chromatography). In one example, the solid support includes inorganic (e.g., silica) material. In another example, the solid support includes organic (e.g., polymeric) material (e.g., synthetic resins). In yet another example, the solid support includes a hybrid inorganic-organic material. The substrate is preferably insoluble in the solvent system used for the respective separation.

In one embodiment, the solid support includes metal oxides or metalloid oxides. Exemplary substrates include silica-based (e.g., silicon oxide, $SiO_2$), titania-based (e.g., titanium oxide, $TiO_2$), germanium-based (e.g., germanium oxide), zirconia-based (e.g., zirconium oxide, $ZrO_2$), alumina-based (e.g., aluminum oxide, $Al_2O_3$) materials or mixtures thereof. Other substrates include cross-linked and non-crosslinked polymers, carbonized materials and metals. Substrates can also incorporate polymeric networks, sol-gel networks or hybrid forms thereof. In one embodiment, the substrate is a silica-based substrate. Exemplary silica-based substrates include silica gel, glass, sol-gels, polymer/sol-gel hybrids, core-shell structures and silica monolithic materials.

Exemplary synthetic resins useful as the organic substrate in the current invention are described in U.S. Pat. No. 4,927,539 to Stevens et al., U.S. Pat. No. 4,351,909 to Stevens et al., U.S. Pat. No. 4,519,905 to Stevens et al., U.S. Pat. No. 4,383,047 and U.S. Pat. No. 5,532,279 to Barretto et al., the disclosures of which are each incorporated herein by reference for all purposes.

The solid support may be formed from any synthetic resin material. Exemplary synthetic polymer ion-exchange resins include poly(phenol-formaldehyde), poly(acrylic acid), poly(methacrylic acid), polynitriles, amine-epichlorohydrin copolymers, graft polymers of styrene on polyethylene or polypropylene, poly(2-chloromethyl-1,3-butadiene), poly(vinylaromatic) resins such as those derived from styrene, alpha-methylstyrene, chlorostyrene, chloromethylstyrene, vinyltoluene, vinylnaphthalene or vinylpyridine, corresponding esters of acrylic acid and methacrylic acid, and similar unsaturated monomers, mono-vinylidene monomers including the monovinylidine ring-containing nitrogen heterocyclic compounds, and any copolymers of the above resins. Additional examples include glycidyl acrylate-based and glycidyl methacrylate-based materials (e.g., 2-glycidyloxyethyl methacrylate, vinylbenzyl glycidyl ether, 2-(4-vinylbenzyloxy)ethyl glycidyl ether) as well as those derived from vinylbenzyl chlorides, vinylbenzyl alcohols, 2-(4-vinylbenzyloxy)ethanol, polyacrylamides, polyvinylalcohols, polyvinylformamides.

Any of the above materials can optionally be co-polymerized with monomers incorporating ionic or ionizable (and optionally reverse-phase) functionalities. Any of the above materials can optionally be functionalized with a suitable ligand incorporating ionic or ionizable and optionally reverse-phase functionalities.

In one embodiment, the support comprises cross-linked polymers or copolymers. An exemplary copolymer is styrene-divinylbenzene copolymer (e.g., PS-DVB). In one example, the styrene-divinylbenzene copolymer contains between about 0% to about 100% divinylbenzene monomer by weight. In another example, the styrene-divinylbenzene copolymer contains between about 25% to about 80% divinylbenzene monomer by weight. The copolymer can be prepared, for example, according to the method of Ikada et al., *Journal of Polymer Science*, Vol. 12, 1829-1839 (1974) or as described in U.S. Pat. No. 4,382,124 to Meitzner, et al.

In one example, the solid support includes a silica-, alumina-, zirconia- or titania-polymeric resin hybrid material. Exemplary silica-organic hybrids are described in U.S. Pat. No. 6,528,167 and U.S. Patent Application Publication 2006/0070937 (application Ser. No. 11/240,695), the disclosures of which are incorporated herein by reference for all purposes.

In one example, the solid support of the present invention is formed by well known suspension polymerization techniques. In this example, the particles are typically derived from a monomer mixture, which is insoluble in the solvents with which they will be contacted. Exemplary substrates are formed by heating and stirring a suspension of monomers in a suitable solvent in the presence of a suitable emulsifying agent. Alternatively, the polymerization may be carried out by a suspension, bulk or solution process followed by grinding the resin to a desired size by mechanical means (e.g., ball mills, rod mills or the like).

The solid support can be of any form, including particulates (e.g., spherical, essentially spherical; e.g., resin beads), chips, chunks, blocks, monoliths and the like. When the substrate is in particulate form, the particles (e.g., irregular-shaped or bead-shaped, e.g., essentially spherical) have a median particle size (i.e., diameter). In one example, the median particle size of the substrate (e.g., spherical silica gel) is between about 0.1 (e.g., silica micro-spheres) and about 10,000 μm (microns). In one example, the median particle size of the substrate is between about 1 and about 5000 microns, between about 1 and about 1000 microns, between about 1 and about 500 microns, between about 1 and about 400 microns, between about 1 and about 300 microns, between about 1 and about 200 microns or between about 1 and about 100 microns. In yet another example, the median particle size of the substrate is between about 1 and about 80 microns, between about 1 and about 70 microns, between about 1 and about 60 microns, between about 1 and about 50 microns, between about 1 and about 40 microns, between about 1 and about 30 microns, between about 1 and about 20 microns or between about 1 and about 10 microns. In other example, the median particle size of the substrate particles is between about 10 and about 100 microns, between about 10 and about 80 microns, between about 40 and about 200 microns, between about 40 and about 100 microns, between about 40 and about 80 microns, between about 60 and about 200 microns, between about 60 and about 100 microns, between about 70 and about 200 microns, between about 80 and about 200 microns, between about 100 and about 200 microns, between about 200 and about 600 microns, between about 200 and about 500 microns or between about 200 and about 400 microns. In a particular example, the substrate is silica-based (e.g., silica gel) having a median particle size of between about 40 and 80 microns. The particle size can also be measured in "mesh" as defined on the Tyler Equivalent scale (the smaller the particle, the higher the mesh number). Typical mesh characteristics range between about 10 and 600. Generally, substrate particles useful in any packed bed chromatographic application (e.g., LC, HPLC or ultra-pressure chromatography) are suitable for use in the compositions of the invention.

In various examples, the support is in particulate form, and multiple support particles are disposed in a packed bed. For example, a plastic or metal column is packed with the support particles.

In other examples, the substrate particles are essentially "monodisperse" or essentially "homodisperse", which indicates that the particle size of the majority of the particles (e.g., 80, 90 or 95% of the particles) does not vary substantially (e.g., not more than 50%) below or above the median particle size (M). In an exemplary monodisperse substrate particle population, 90% of the particles have an average particle size of between about 0.5×M and about 1.5×M.

In another example, the substrate is an inorganic or organic monolith. In one example the solid support includes a silica monolith. In another example, the solid support includes an alumina monolith. In yet another example, the solid support includes a zirconia monolith. In a further example, the solid support includes a titania monolith. Exemplary monolithic materials based on organic compositions and methods of preparing such materials are described in U.S. Pat. Nos. 5,130,343; 5,929,214; 5,728,457; 5,260,094; 6,887,384; 5,334,310; 7,303,671; 5,453,185 and 7,074,331, the disclosures of which are incorporated herein by reference in their entireties for all purposes.

When a porous substrate is used, the pores of the substrate can be of any size. In a typical substrate, the average pore size is equal to or smaller than the micro-particles, described herein below. The nominal pore size is typically measured in angstroms ($10^{-10}$ m, Å). In one example, the average diameter of the substrate pores is between about 1 and about 5000 Å. In another example, the volume average diameter of the substrate pores is between about 10 and about 5000 Å, between about 10 and about 4000 Å, between about 10 and about 3000 Å, between about 10 and about 2000 Å, between about 10 and about 1000 Å, between about 10 and about 800 Å, between about 10 and about 600 Å, between about 10 and about 400 Å, between about 10 and about 200 Å, between about 10 and about 100 Å, between about 20 and about 200 Å, between about 20 and about 100 Å, between about 30 and about 200 Å, between about 30 and about 100 Å, between about 40 and about 200 Å, between about 40 and about 100 Å, between about 50 and about 200 Å, between about 50 and about 100 Å, between about 60 and about 200 Å, between about 60 and about 100 Å, between about 70 and about 200 Å, between about 70 and about 100 Å, between about 80 and about 200 Å, between about 100 and about 200 Å, between about 100 and about 300 Å, between about 100 and about 400 Å, between about 100 and about 500 Å, between about 200 and about 500 Å or between about 200 and about 600 Å.

The specific surface area of the substrate is typically between about 0.1 and about 2,000 m$^2$/g. For example, the specific surface area of the substrate is between about 1 and about 1,000 m$^2$/g, between about 1 and about 800 m$^2$/g, between about 1 and about 600 m$^2$/g, between about 1 and about 400 m$^2$/g, between about 1 and about 200 m$^2$/g or between about 1 and about 100 m$^2$/g of resin. In another example, the specific surface area of the substrate is between about 3 and about 1,000 m$^2$/g, between about 3 and about 800 m$^2$/g, between about 3 and about 600 m$^2$/g, between about 3 and about 400 m$^2$/g, between about 3 and about 200 m$^2$/g or between about 3 and about 100 m$^2$/g of resin. In yet another example, the specific surface area of the substrate is between about 10 and about 1,000 m$^2$/g, between about 10 and about 800 m$^2$/g, between about 10 and about 600 m$^2$/g, between about 10 and about 400 m$^2$/g, between about 10 and about 200 m$^2$/g or between about 10 and about 100 m$^2$/g of resin.

In one example, the substrate includes negatively or positively ionizable or charged groups, and these ionizable groups are "capped" by reaction with excess ligand or with another agent.

In exemplary embodiments, the substrate is suitable for chemical modification with an organic ligand. In one example, the substrate is an organic polymeric substrate. Such substrates can be modified with an organic ligand by taking advantage of functional groups present on the polymer. In one example, the polymer is a co-polymer of styrene and divinylbenzene (PS-DVB) functionalized with a ligand incorporating an amino group or a carboxylic acid group. The ligand may be derived from a thiol-group containing precursor. The thiol analog may be heated with the polymer in the presence of a radical initiator, such as 2,2'-azobis(2-methylpropionitrile).

In another example, the substrate is an inorganic substrate, such as silica. Silica can be covalently modified using reactive silyl ligands.

Exemplary ligands and methods of their attachment to the substrate are described hereinbelow.

Ligands

In various examples of the invention, the substrate is covalently modified with at least one type of organic ligand. In one example, the ligand includes at least one group capable of participating in aromatic stacking with one or more analyte in a sample. Exemplary aromatic stacking groups include planar aromatic moieties, e.g., aryl, heteroaryl and moieties in which another moiety, e.g., an imine, is fused to an aromatic moiety. An exemplary aromatic stacking moiety is an aryl or heteroaryl imidyl moiety.

In an exemplary embodiment, the ligand of use in preparing the stationary phases of the invention includes a moiety according to Formula (I) or (II):

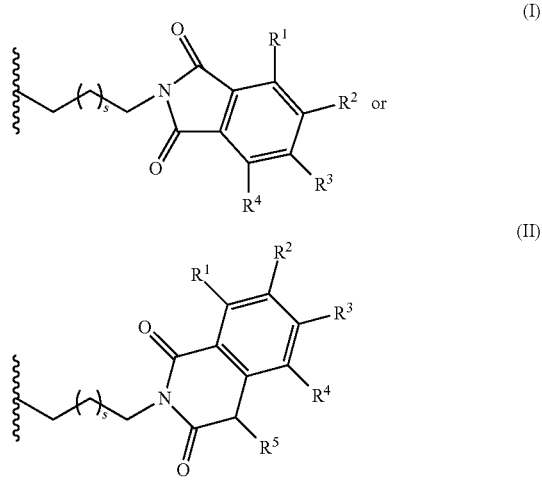

in which, s is an integer which is 6, 7, 8, 9, 10, 11, 12 or greater as set forth in paragraph 0047 herein. $R^1, R^2, R^3, R^4$ and $R^5$ are independently selected aryl group substituents as defined herein. In exemplary embodiments, the radicals are members independently selected from H, substituted or unsubstituted alkyl, substituted or unsubstituted heteroalkyl, substituted or unsubstituted aryl, and substituted or unsubstituted heteroaryl. In various embodiments, two or more of $R^1, R^2, R^3$ and $R^4$, together with the atoms to which they are attached are joined to form a fused ring structure with the phenyl ring. In this way, various naphthyl, anthracenyl and other fused rings systems are included within the structure above.

Attachment of Ligands to the Solid Support

In one example, the solid support is functionalized using reactive ligands. For example, the reactive ligand (e.g., silyl ligand) includes a reactive functional group, useful for attachment to the solid support. The reactive functional group of the ligand is capable of reacting with the solid support (e.g., with complementary reactive functional groups on the surface of the solid support) to form one or more covalent bonds.

Attachment of Ligands to an Inorganic Solid Support

Methods for the attachment of ligands to inorganic substrates, such as silica substrates are known. Exemplary methods are described herein and, e.g., in WO2006/088760 (filed Feb. 10, 2006), WO2006/054559 (filed Sep. 10, 2004), WO2005/047886 (filed Oct. 4, 2004), U.S. patent application Ser. No. 11/753,934 (filed May 25, 2007), H. Minakuchi et al., *Anal. Chem.* 1996, 68: 3498-3501, H. Minakuchi et al., *J. Chromatogr.* 1998, 797: 121-131 U.S. Pat. No. 6,248,798, U.S. Pat. No. 5,968,363, U.S. Pat. No. 5,865,994, U.S. Pat. No. 5,936,003 and U.S. Pat. No. 5,925,253, the disclosures of which are each incorporated herein by reference for all purposes.

In one example, the reactive ligand includes a reactive silyl group. For example, the reactive silyl group can react with the surface of a silica substrate comprising surface silanol (e.g., Si—OH) groups to create siloxane bonds between the silyl ligand and the silica substrate. In various embodiments, the reactive ligand includes an activated silyl group having a structure according to Formula (III):

In exemplary silyl groups according to Formula (III), $R^{20}$, $R^{21}$ and $R^{22}$ are independently selected silyl group substituents. An activated silyl group includes at least one reactive silyl group substituent. A reactive silyl group substituent is capable of reacting with a substrate as defined herein to form a covalent bond between the ligand and the substrate. Thus, at least one of $R^{20}, R^{21}$ and $R^{22}$ is a reactive silyl group substituent. Exemplary reactive silyl group substituents include alkoxy groups, halogens, primary or secondary amino groups and carboxylic acid groups.

In one embodiment, $R^{20}, R^{21}$ and $R^{22}$ are members independently selected from halogen, $OR^{14}$, $NR^{14}R^{15}$, $OC(O)R^{16}$, $OS(O)_2R^{16}$, acyl, substituted or unsubstituted alkyl, substituted or unsubstituted heteroalkyl, substituted or unsubstituted aryl, substituted or unsubstituted heteroaryl, substituted or unsubstituted cycloalkyl and substituted or unsubstituted heterocycloalkyl. Each $R^{14}$ and each $R^{15}$ is a member independently selected from H, substituted or unsubstituted alkyl, substituted or unsubstituted heteroalkyl, substituted or unsubstituted aryl, substituted or unsubstituted heteroaryl and substituted or unsubstituted heterocycloalkyl. Each $R^{16}$ is a member independently selected from substituted or unsubstituted alkyl, substituted or unsubstituted heteroalkyl, substituted or unsubstituted aryl, substituted or unsubstituted heteroaryl and substituted or unsubstituted heterocycloalkyl. In one embodiment, at least one of $R^{20}, R^{21}$ and $R^{22}$ is other than OH, unsubstituted alkyl, unsubstituted aryl, unsubstituted heteroaryl and unsubstituted heterocycloalkyl. In another embodiment, at least one of $R^{20}, R^{21}$ and $R^{22}$ is alkoxy or halogen. Exemplary reactive silyl groups useful for the covalently linkage of a reactive ligand to the solid support include:

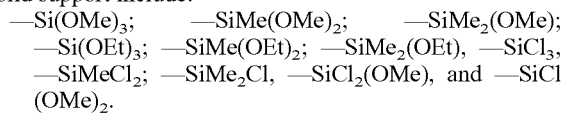

At least one of $R^{20}, R^{21}$ and $R^{22}$ is a non-reactive silyl group substituent, which includes the linker tethered to the aromatic stacking moiety. In another example, two of $R^{20}, R^{21}$ and $R^{22}$ are non-reactive silyl group substituents. In addition to the linker-aromatic stacking moiety, exemplary non-reactive silyl group substituents include alkyl groups or aryl groups. In one embodiment, one of $R^{20}, R^{21}$ and $R^{22}$ is the linker-aromatic stacking moiety and another is a member selected from unsubstituted $C_1$-$C_6$ alkyl (e.g., methyl, ethyl, n-propyl, iso-propyl, n-butyl, iso-butyl and the like).

In one example, the reactive ligand, which is used for covalent modification of the solid support includes an aromatic stacking group. Alternatively, the reactive ligand includes a group, which can be converted to an aromatic stacking group after coupling of the reactive ligand to the solid support. For example, the reactive ligand can contain a reactive group or a protected reactive group, which is reacted with a reactive aromatic stacking moiety, thereby conjugating the aromatic stacking moiety to the linker.

Any number of different ligands can be bound to the solid support. In one example, the functional layer consists essentially of one type of ligand. In another example, the functional layer includes at least two different ligand structures. When two or more ligand structures are present, the structures can differ in the identity of the aromatic stacking moiety, the linker or both. For example, in addition to the linker-aromatic stacking moiety ligand, the compositions of the invention can further include reverse-phase (e.g., $C_8$ or $C_{18}$) ligands bound to the same solid support.

The ligands can optionally include additional polar groups (e.g., ether, thioether, amide, sulfonamide, urea, thiourea, carbonate, carbamate, and the like). In an exemplary embodiment, one or more polar group is internal to the linker.

The ligands also include linker moieties (e.g., alkyl or aromatic moieties). The term "linker moiety" is defined herein. In one embodiment, the linker has at least 6, at least 7, at least 8, at least 9, at least 10, at least 11 or at least 12 carbon atoms in sequence, wherein at least two of the carbon atoms in sequence are optionally part of a substituted or unsubstituted ring (e.g., substituted or unsubstituted aryl, substituted or unsubstituted heteroaryl, or substituted or unsubstituted cycloalkyl). In one example, the hydrophobic moiety is sufficiently hydrophobic for the ligand to exhibit reversed phase characteristics. In this example, the linker provides a component of a reverse-phase moiety. Hence, in one example, the linker includes at least 8, at least 9, at least 10, at least 11 or at least 12 carbon atoms in sequence. For example, when the linker of the aromatic stacking ligand includes a hydrophobic moiety, the resulting stationary phase of the invention provides reverse-phase capabilities in addition to aromatic and steric selection capabilities. Such a material can, e.g., be used to analyze uncharged molecules in addition to ionic or ionizable analytes (e.g., within the same sample). The added reverse phase capabilities can be exploited to analyze samples containing organic hydrophobic and/or polar molecules in addition to ionic or ionizable molecules.

Attachment of Ligands to an Organic (Polymeric) Solid Support

Methods for the attachment of ligands to organic substrates, such as polymeric resins are known to those of skill in the art. In one example, the substrate is prepared from monomers, which after polymerization provide unsaturated groups, such as vinyl groups. In one example, the polymer is a co-polymer of styrene and divinylbenzene (PS-DVB). The unsaturated groups (e.g., vinyl groups) of these resins can be used to attach an ion-exchange ligand. In one example, the ligand includes a thiol-group, which is added to the double bond via an addition mechanism involving radical intermediates, thereby forming a thio-ether bond between the ligand and the solid support. Such reactions are described, e.g., in WO/03022433 (filed Sep. 5, 2002). An exemplary method is illustrated in Scheme 1, below:

Scheme 1:

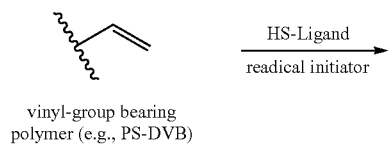

vinyl-group bearing
polymer (e.g., PS-DVB)

-continued

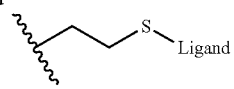

In another approach, the organic polymeric solid support incorporates a monomer that provides a reactive functional group, which can be used to covalently link ligand to the solid support. In one example, the monomer incorporates a carboxylic acid group or an ester group, which can be hydrolyzed to form a carboxylic acid group after polymerization. Exemplary monomers according to this example include acrylic acid, methacrylic acid, alkyl (e.g., methyl or ethyl) acrylates and alkyl (e.g., methyl or ethyl)methacrylates. The carboxylic acid group can be reacted with a complimentary reactive functional group on the ligand. In one example, the ligand includes an amino group, which can be reacted with the carboxylic acid group to form an amide bond between the solid support and the ligand. The carboxylic acid group can be activated, for example, by formation of an acid chloride prior to reaction with the reactive ligand.

In another example, the polymeric solid support incorporates a monomer that includes an epoxide group. The epoxide ring can be opened using a nucleophilic ligand thereby forming a covalent bond between the ligand and the solid support. For example, the ligand can include an amino group (e.g., a primary amino group) or a sulfhydryl group, which can react with the epoxide ring to form, e.g., an amine or a thio-ether linkage between the ligand and the solid support, respectively. Exemplary monomers that include an epoxide ring and can be incorporated into a polymer include glycidyl acrylate, glycidyl methacrylate, 2-glycidyloxyethyl methacrylate, vinylbenzyl glycidyl ether, 2-(4-vinylbenzyloxy)ethyl glycidyl ether.

In yet another example, the polymeric solid support incorporates a monomer that includes a leaving group, such as a halogen substituent, which can, e.g., be replaced with a nucleophilic ligand in a nucleophilic substitution reaction thereby forming a covalent bond between the ligand and the solid support. An exemplary monomer is vinylbenzyl chloride.

In a further example, the polymeric solid support incorporates a monomer that includes a hydroxyl group or a sulfhydryl group. The hydroxyl group can, e.g., be used to covalently link a ligand to the solid support via the formation of an ether-bond or a thio-ether bond, respectively. Exemplary monomers incorporating a hydroxyl group include vinylbenzyl alcohol and 2-(4-vinylbenzyloxy)ethanol.

Columns

The current invention also provides embodiments, in which the compositions of the invention are contained in a container. The container is preferably a chromatography column. Exemplary chromatography columns include metal columns, glass columns and columns made from a polymeric material, such as plastics. Metal columns may be those commonly used for chromatography procedures employing high pressure (e.g., HPLC, ultra pressure). Plastic columns may be those commonly employed for preparative chromatography systems. Such polymeric columns are frequently disposable and are often referred to as cartridges. Hence, in one embodiment, the invention provides a chromatography column packed with a separation medium that includes a composition of the invention. In another example, the invention provides a chromatography column including a monolithic composition of the invention. In yet another example, the invention provides a composition of the invention in a flow-through bed suitable for use as a chromatographic medium.

Chromatographic Properties

Phenyl-type phases are usually superior in enhancing interaction with aromatic compounds. The unique chemistry of the stationary phases of the invention further expands aromatic interaction for unique selectivity while maintaining sufficient hydrophobic interaction and aqueous compatibility.

High aromatic selectivity Triphenylene (T) and o-terphenyl (O) both contain the same carbon number, but in different shapes—the former planar, the latter propeller-shaped. Retention factor ratio between triphenylene (T) and o-terphenyl (O), α(T/O)=k'T/k'O is often used as a descriptor to measure the shape selectivity of the stationary phase. However, when it comes to a phenyltype column, this descriptor in fact measures the aromatic selectivity rather than shape selectivity of the phase. Enhanced aromatic selectivity is beneficial for applications in drug development and testing in which analytes commonly contain aromatic rings. As shown in FIG. 1, the Acclaim Phenyl column shows the highest α(T/O) value compared to other commercial phenyl-type stationary phases including biphenyl, diphenyl, C6-phenyl, and C3-phenyl phases.

High Hydrophobic Retention

Figure 8:
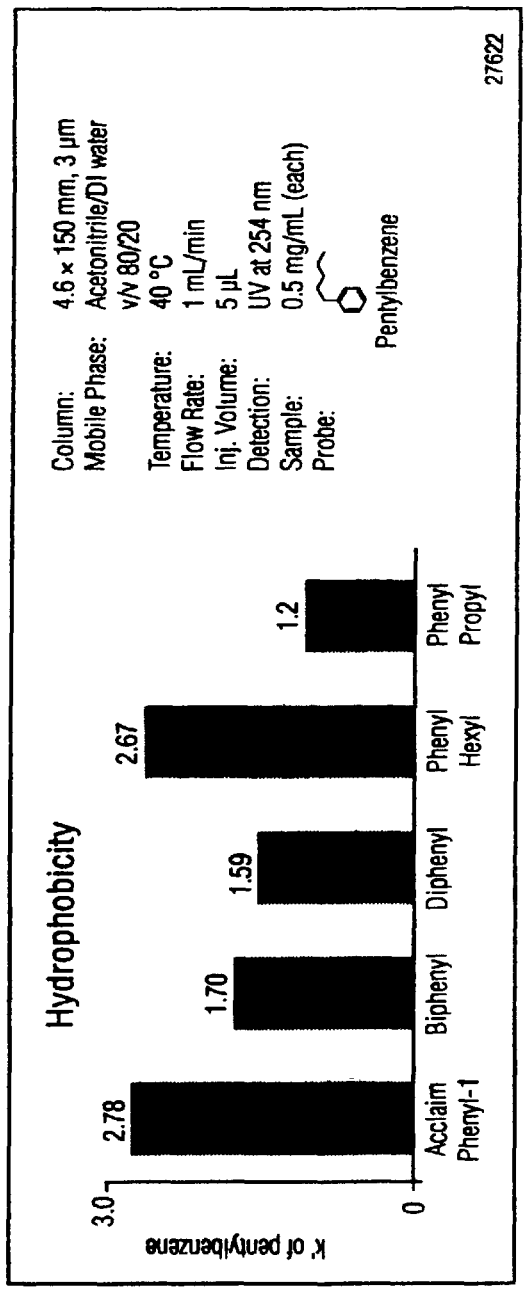
FIG. 8 is plot comparing the hydrophobicity of an exemplary support of the invention (6) compared with other phenyl-type phases.

Due to the incorporation of an alkyl chain into the stationary phase, the solid support of the invention, e.g., 6, exhibits high hydrophobicity compared to other commercial phenyl-type phases, including biphenyl, diphenyl, C6-phenyl and C3-phenyl phases (FIG. 8). This feature is highly desirable for retaining a broad range of analytes.

Unique and Complementary Selectivity

Figure 6A:
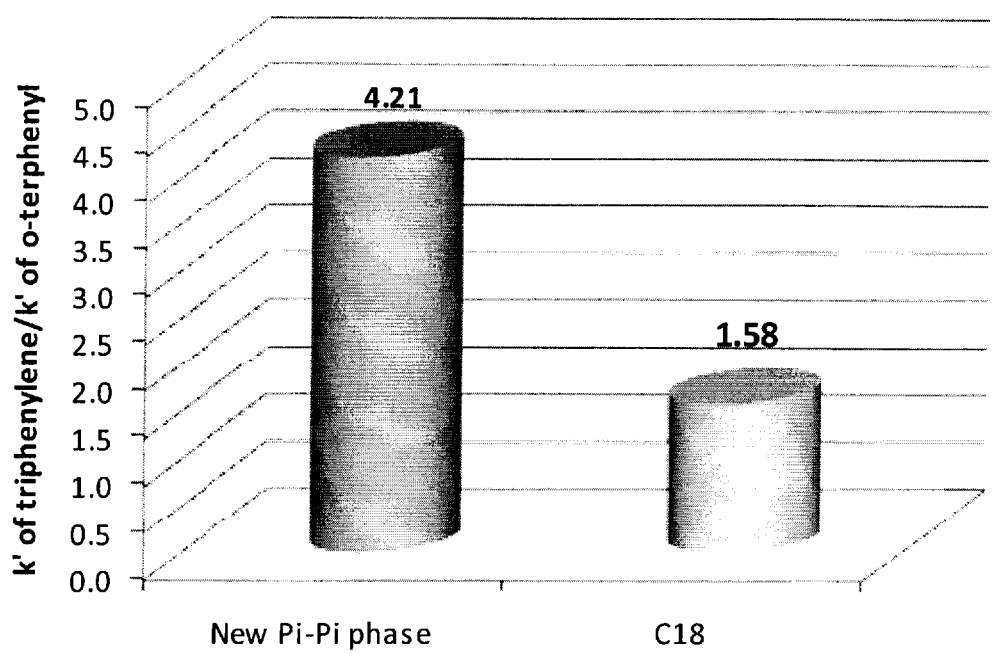
FIG. 6a is a plot showing the steric selectivity of an exemplary stationary phase (6) of the invention.
Figure 6B:
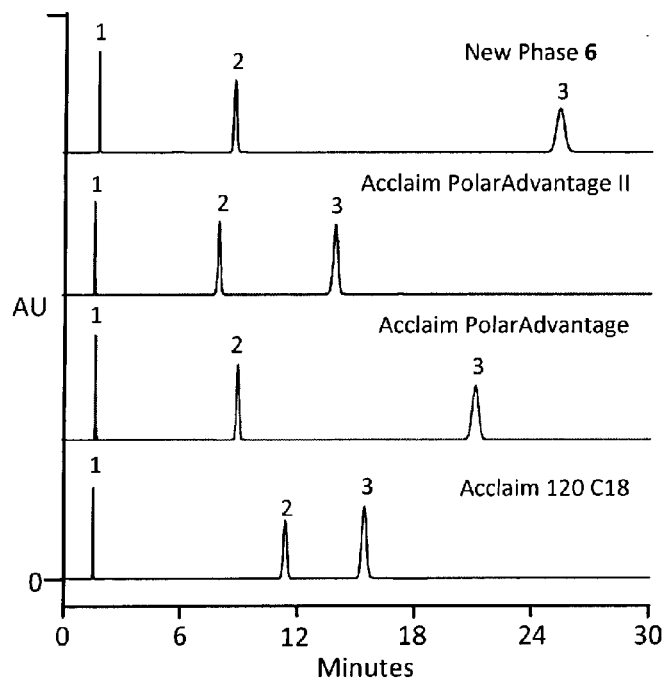
FIG. 6b is a chromatogram showing the effects of the steric selectivity of an exemplary stationary phase (6) of the invention on the retention time of components of a model sample.
Figure 6B:
Figure 6B:
Figure 6C:
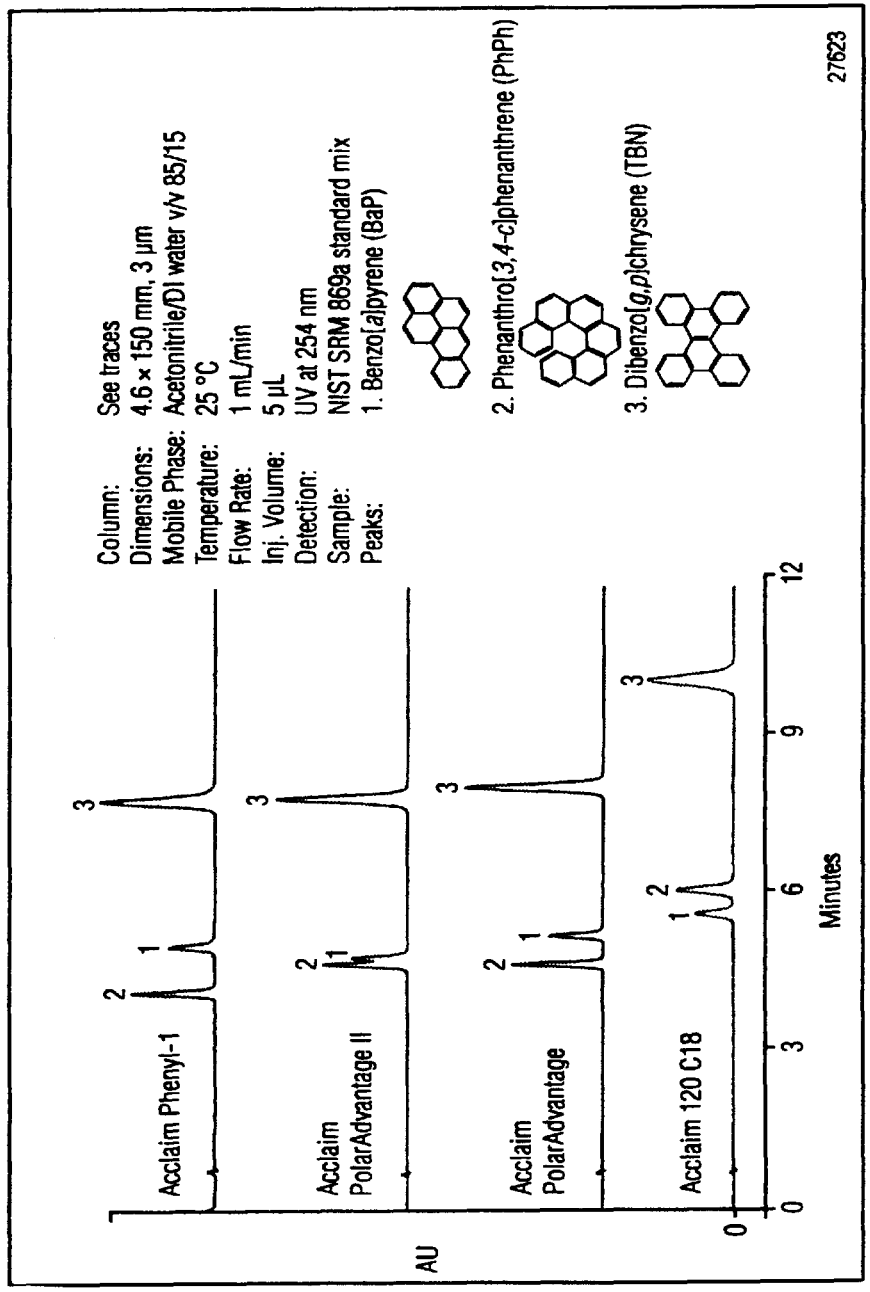
FIG. 6c is a series of chromatograms showing the polycyclic aromatic hydrocarbon selectivity of exemplary support 6 of the invention compared with other phenyl-type phases.

The National Institute of Standards and Technology (NIST) Standard Reference Material (SRM) 869a is useful for characterizing liquid chromatographic (LC) column selectivity for separation of polycyclic aromatic hydrocarbons (PAHs). This SRM is a mixture of three PAHs in acetonitrile: benzo[a]pyrene (BaP), 1,2:3,4:5,6:7,8-tetrabenzonaphthalene (TBN, alternate name, dibenzo[g,p]chrysene), and phenanthro[3,4-c]phenanthrene (PhPh) (see FIG. 6c for structures). Depending on the elution order of the three components, column selectivity can be predicted for complex PAH mixtures. FIG. 6c demonstrates the elution order of these three PAHs on a column packed with a stationary phase of the invention, e.g., 6, and three other Acclaim reversed-phase columns: Acclaim 120 C18, Acclaim PolarAdvantage (sulfonamide-embedded), and Acclaim PolarAdvantage II (amide-embedded). It is clear that phase 6 shows different and complementary selectivity.

Figure 6D:
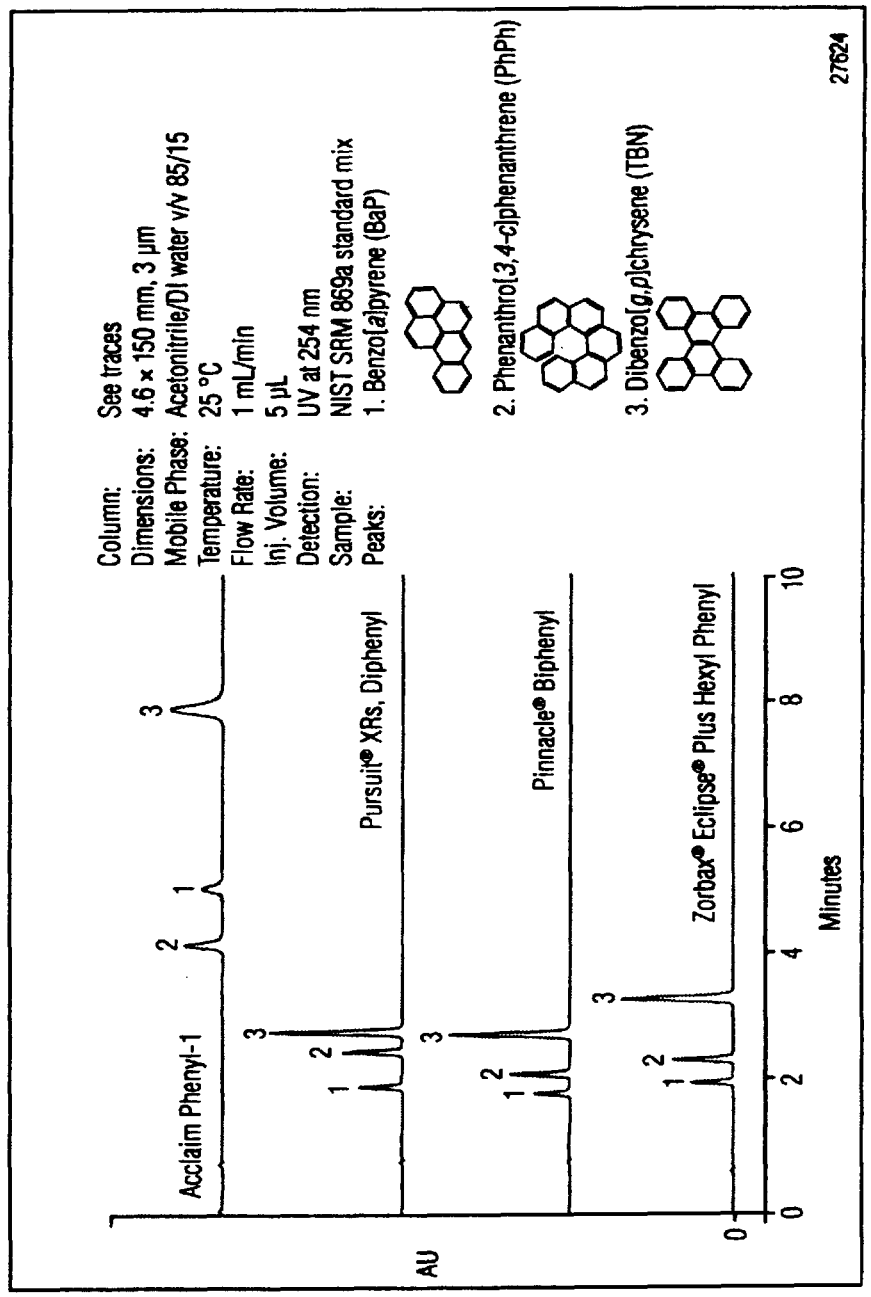
FIG. 6d is a series of chromatograms showing the polycyclic aromatic hydrocarbon selectivity of exemplary support 6 of the invention compared with other phenyl-type phases.

Compared to other commercial phenyl-type columns, a column containing a stationary support of the invention, e.g., 6, also retains aromatic compounds much more strongly, providing separation options for a much wider range of compounds (FIG. 6d).

In an exemplary embodiment, the invention provides a solid support capable of separating two or more polycyclic aromatic hydrocarbons. In various embodiments, the invention provides a stationary support and a method that provides the degree of separation discussed above for a member selected from NIST SRM 869a, NIST SRM 869c and a combination thereof. In various embodiments, the solid support is capable of separating two or more polycyclic aromatic hydrocarbons with a resolution set forth in paragraph [0114] herein. An exemplary solid support is 6.

Figure 7:
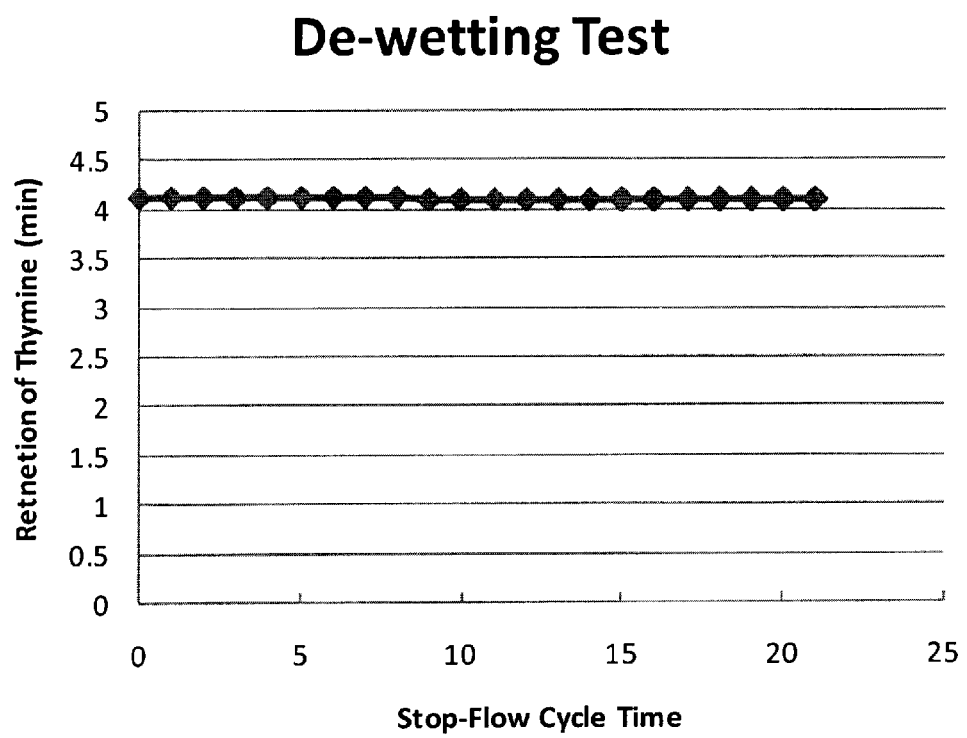
FIG. 7 is a plot displaying the results of a wetting test of an exemplary stationary phase of the invention (6).

Fully compatible with highly aqueous mobile phase most reversed-phase columns have high ligand densities, designed to improve the peak shape of basic analytes and stability at extreme pHs. However, dense surface coverage of silica particles with hydrocarbon chains often leads to inconsistent retention times in 100% aqueous conditions. Although the low ligand density bonding is used to achieve better compatibility with 100% aqueous mobile phases, these phases provide poor peak shapes for bases and lower hydrolytic stability. As shown in FIG. 7, a column packed with a stationary phase of the invention, e.g., 6, performs consistently well under 100% aqueous conditions—only negligible loss of retention was observed after 20 stop-flow cycles. In an exemplary embodiment, the solid support of the invention provides baseline separation of two or more analytes using an eluent that is about 100%, 95%, 90%, 85%, 80%, 75% or 70% water.

IV. Methods

The compositions and compounds of the invention may be synthesized using methods known in the art and those described herein. Variation of those methods may be necessary to synthesize compositions of certain embodiments. Those alternative methods will be apparent to a person of skill in the art. Starting materials and reagents useful for preparing the compositions and compounds of the invention are commercially available or can be prepared using art-recognized methodologies. Exemplary methods for the preparation of reactive silyl ligands and the preparation of exemplary functionalized substrates are provided e.g., in WO2006/088760 (filed Feb. 10, 2006), WO2006/0054559 (filed Sep. 10, 2004) and WO2005/047886 (filed Oct. 4, 2004), the disclosures of each of which are incorporated herein by reference for all purposes. Other reactive silyl ligands are commercially available.

An exemplary method of preparing a stationary phase of the invention includes: (a) providing a solid support having an interior and exterior surface; and (b) covalently bonding organic ligands at least the exterior surface or to both the interior and exterior surface. The ligands include at least one aromatic stacking moiety and at least one linker covalently attached to the substrate and to the aromatic stacking moiety.

Chromatographic Methods

The current invention further provides a chromatographic method (e.g., for separating analytes in a liquid sample). The method involves flowing a liquid sample through a monolith, or a packed bed of separation medium of the invention, that includes a composition of the invention. In one example, the liquid includes an analyte. For example, the liquid includes at least one type of aromatic compound. In exemplary embodiments, the method of the invention allows for the separation of two or more aromatic compounds. The method of the invention further allows the separation of one or more aromatic compound from one or more non-aromatic compound. The verb "to separate" or any grammatical version thereof, in this context, refers to at least two analytes eluting from a separation medium, each with a separate peak. In various embodiments, the invention provides a solid support capable of yielding a chromatogram with the peak corresponding to the first analyte and that corresponding to the second analyte completely separated at about 50%, at least about 40%, at least about 30%, or at least about 20% peak height of at least one peak, preferably, at least about 50%, at least about 40%, at least about 30%, or at least about 20% peak height of the first and second peak (as measured from the top of the peak to the baseline; thus, 30% of peak height encompasses 70% of the peak height from top towards baseline, whereas 50% of peak height encompasses 50% of the peak height from top towards baseline). In an exemplary embodiment, the first and second peaks are separated with baseline separation between the peaks. In an exemplary embodiment, the chromatogram includes at least three, at least four, at least five, at least six, at least seven, at least eight, at least nine, or at least ten peaks and at least three, at least four, at least five, at least six, at least seven, at least eight, at least nine, or at least ten of these peaks are separated to the degree discussed immediately above. In an exemplary embodiment, at least two of the analytes are aromatic analytes, and these analytes are separated to the degree discussed immediately above.

In one example, the mobile phase useful in the methods of the invention, includes water. The water content of the mobile phase is preferably between about 0.1% (v/v) and 100% (v/v), more preferably between about 1% and about 100% (v/v), even more preferably between about 10% and about 100% (v/v) and most preferably between about 20% and about 100% (v/v). The solid support of the invention has unique dewetting properties (FIG. 7), which make it particularly well-suited for performing aqueous separations. Thus, the invention provides a method of separating a first component of a sample mixture from a second component of a sample mixture The invention further provides a method of separating analytes in a liquid sample comprising flowing said liquid sample through a chromatographic medium comprising a composition of the invention. Exemplary analytes separable using the solid supports and the methods of the invention are set forth below.

Polycyclic Aromatic Hydrocarbons

In an exemplary embodiment, the invention provides a solid support capable of separating and a method for separating two or more polycyclic aromatic hydrocarbons. In various embodiments, the invention provides a stationary support and a method that provides the degree of separation discussed above for a member selected from NIST SRM 869a, NIST SRM 869c and a combination thereof. In an exemplary embodiment, two or more, or three of the peaks from this standard are baseline resolved. In various embodiments, the baseline resolution is effected using a standard NIST SRM mixture with an injection volume of 5 µL, acetonitrile:water (85:15) as an eluent at a flow rate of 1 mL/min. and a column of solid support of dimensions 4.6×150 mm. An exemplary solid support has an average size of 3 µm. In an exemplary embodiment, the solid support is 6.

Glucocorticosteroids

Figure 9:
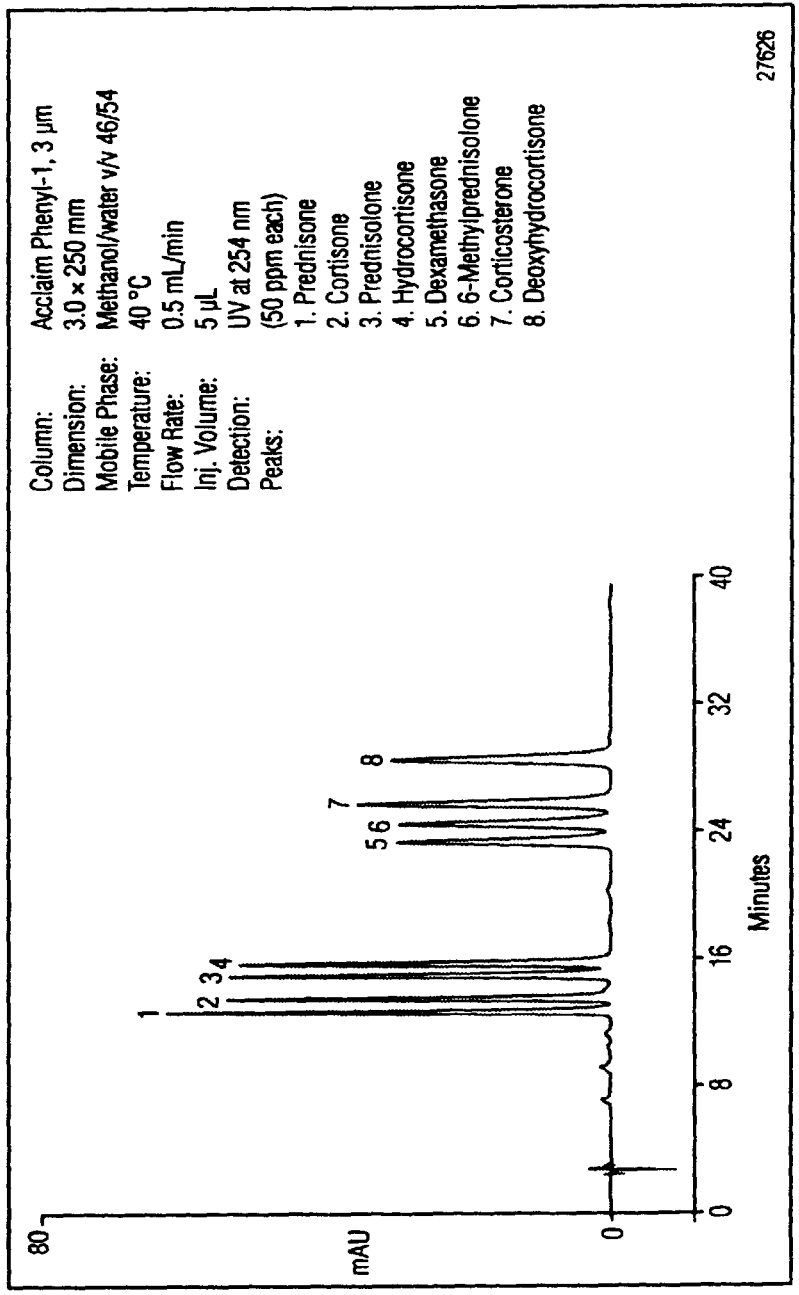
FIG. 9 is a chromatogram showing separation of glucocorticosteroids on an exemplary support of the invention (6).

In an exemplary embodiment, the present invention provides a method and a solid support for separating two or more glucocorticosteroids. In an exemplary embodiment, this solid support is 6. Glucocorticosteroids are a group of naturally occurring and synthetic hormones that moderate inflammation and other stress responses. All glucocorticosteroids are on the World Anti-Doping Agency's 2005 list of substances prohibited in competition when administered orally, rectally, intravenously, or intramuscularly. Separation of these substances has proven to be challenging. The unique chemistry of the solid supports of the invention provides selectivity superior to conventional C18 columns for the separation of glucocorticosteroids. As shown in FIG. 9, eight glucocorticosteroids are baseline resolved on a 3×250 mm Acclaim Phenyl-1 column (i.e., packed with stationary support 6) using a methanol/water mobile phase system.

In an exemplary embodiment, the stationary phase of the invention is able to effect separation as described above of two or more, in any combination, of prednisone, cortisone, prednisolone, hydrocortisone, dexamethasone, 6-methylprednisolone, corticosterone, and deoxyhydrocortisone.

Hormones

In an exemplary embodiment, the invention provides a stationary support and method for separating two or more hormones. In an exemplary embodiment, the hormones are steroid hormones. In various embodiments, the hormones are estrogens.

Estrogens are a group of steroid compounds, named for their importance in the estrous cycle, that function as the primary female sex hormone. Estrogens are used as part of some oral contraceptives and in estrogen-replacement therapy for postmenopausal women.

Figure 10:
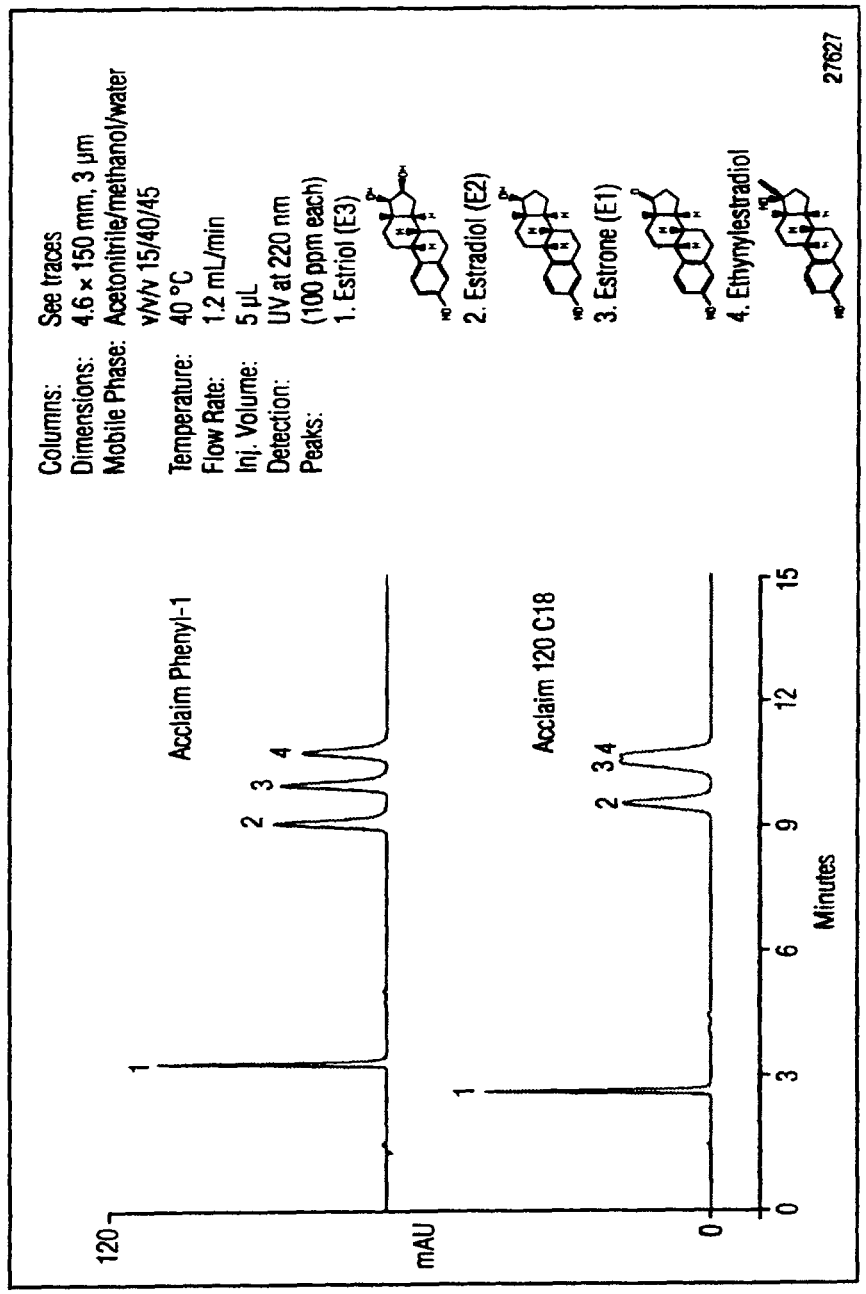
FIG. 10 is a comparison of chromatograms generated using an exemplary support of the invention (6) and another phenyl-type phase.

Three major naturally occurring estrogens in women are estrone (E1), estradiol (E2), and estriol (E3). Estradiol (E2) is the predominant form in nonpregnant females, estrone is produced during menopause, and estriol is the primary estrogen of pregnancy. Ethynylestradiol, a derivative of estradiol, is an orally bioactive estrogen used in almost all modern formulations of combined oral contraceptive pills. While the standard C18 column fails to separate these four compounds, a column packed with a stationary support of the invention, e.g., 6, can baseline resolve them isocratically (FIG. 10).

In an exemplary embodiment, the stationary phase of the invention is able to effect separation as described above of two or more, in any combination, of estriol, estradiol, estrone, and ethynylestradiol.

Fat-Soluble Vitamins

Along with water-soluble (B-complex and C) vitamins, fat-soluble (A, D, E, and K) vitamins are essential nutrients in small amounts for various roles in the human body. Vitamin A, also called retinol, has many functions in the body. In addition to helping the eyes adjust to light changes, vitamin A plays an important role in bone growth, tooth development, reproduction, cell division, and gene expression. In addition, the skin, eyes and mucous membranes of the mouth, nose, throat, and lungs depend on vitamin A to remain moist. Vitamin D plays a critical role in the body's use of calcium and phosphorous. It increases the amount of calcium absorbed from the small intestine and helps form and maintain bones. Children especially need adequate amounts of vitamin D to develop strong bones and healthy teeth. Vitamin E acts as an antioxidant, protecting vitamins A and C, red blood cells and essential fatty acids from destruction. Vitamin K plays an essential role in normal blood clotting and helps promote bone health.

Figure 11:
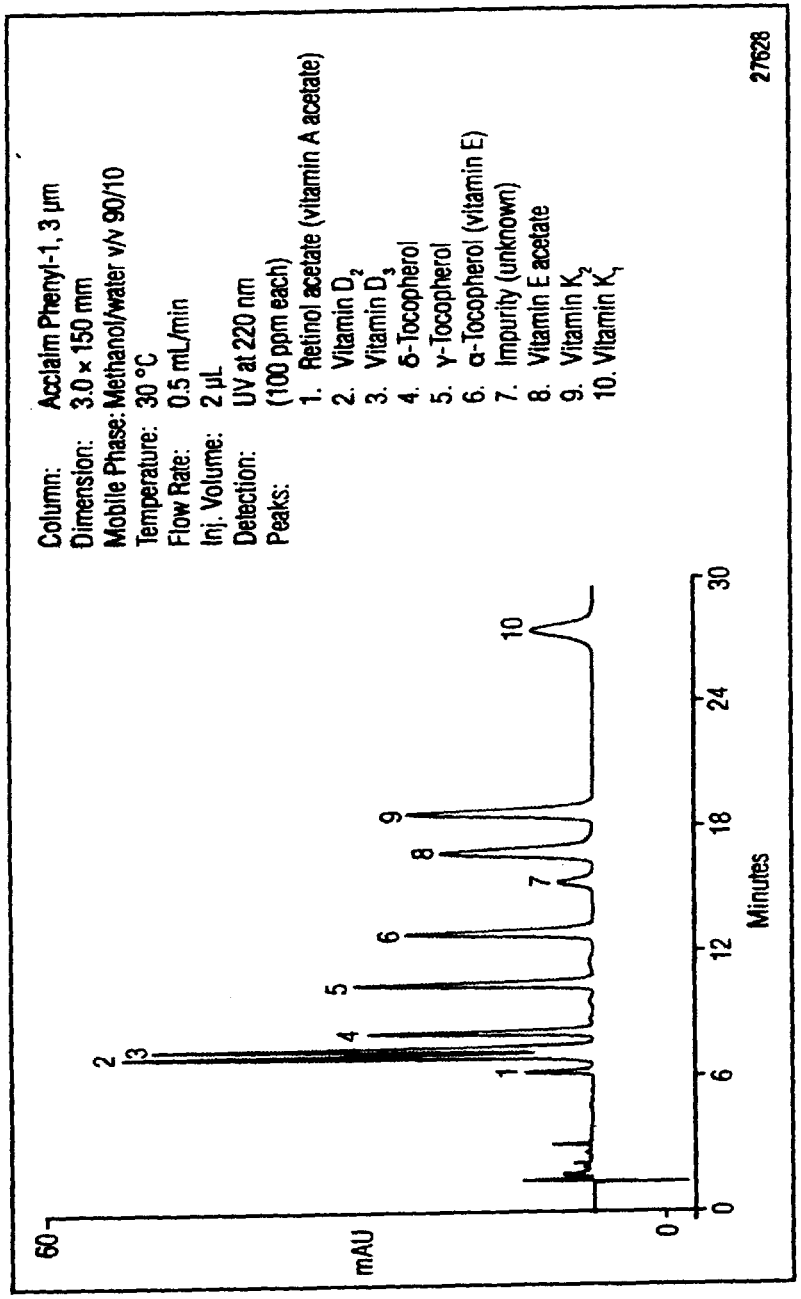
FIG. 11 is a chromatogram showing the separation of a mixture of fat-soluble vitamins on an exemplary support of the invention (6).

Unlike water-soluble vitamins that need regular replacement in the body, fat-soluble vitamins are stored in the liver and fatty tissues, and are eliminated at a much slower rate. At a result, they can pose a greater risk for toxicity than water-soluble vitamins when consumed in excess. On the other hand, some health problems may decrease the absorption of fat, and in turn, decrease the absorption of vitamins A, D, E, and K. Like water-soluble vitamins, analysis of fat-soluble vitamins is an important and challenging assay for various products like pharmaceuticals, foods, beverages, and nutritional supplements. As shown in FIG. 11, a stationary support of the invention, e.g., 6, provides excellent selectivity for separating vitamins A, $D_2$, $D_3$, $K_1$, $K_2$, as well as vitamin E and vitamin E acetate along with related substances, δ- and γ-tocopherols, under both gradient and isocratic conditions.

In an exemplary embodiment, the stationary phase of the invention is able to effect separation as described above of two or more, in any combination, of retinol acetate, vitamin $D_2$, vitamin $D_3$, δ-tocopherol, γ-tocopherol, α-tocopherol, vitamin E actetate, vitamin $K_2$, vitamin $K_1$.

Phospholipids

Figure 12:
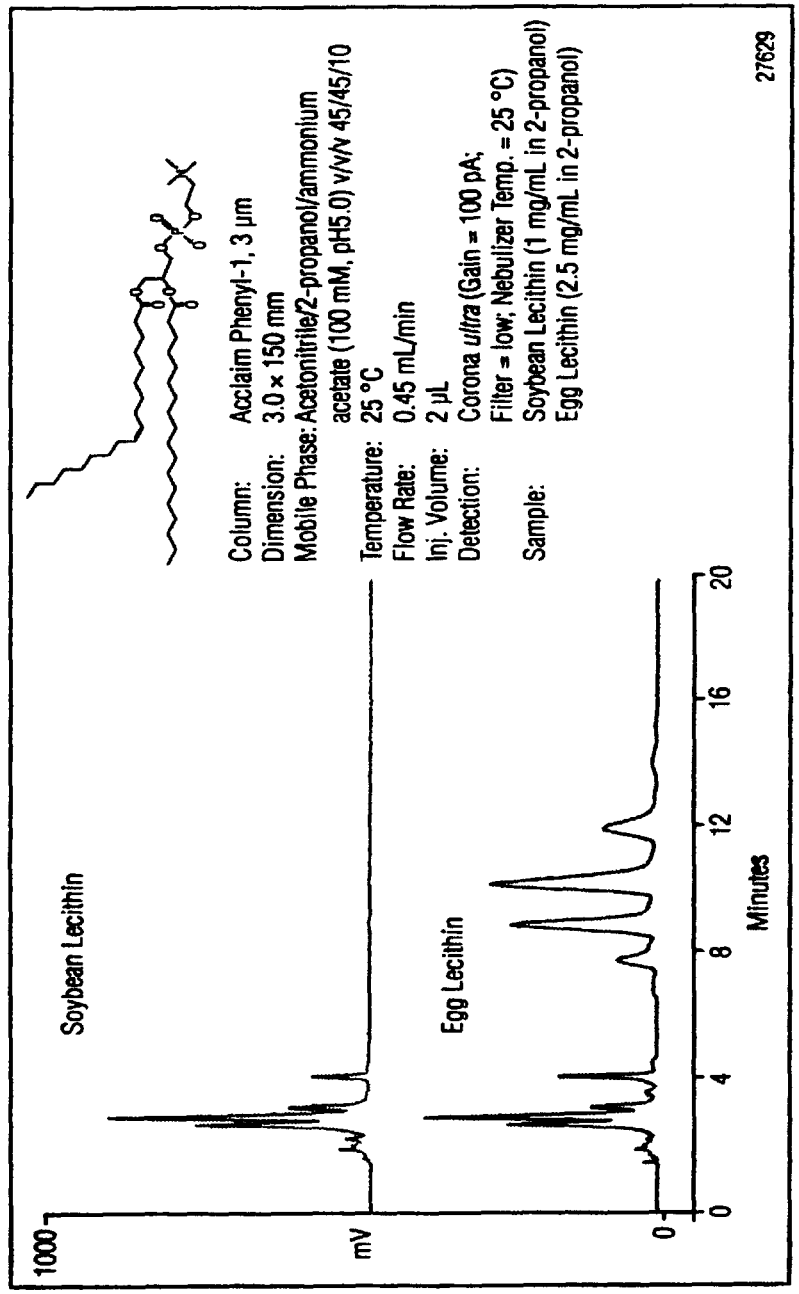
FIG. 12 is two chromatograms showing the separation of components of soybean lecithin and egg lecithin on an exemplary support of the invention (6).
Figure 13:
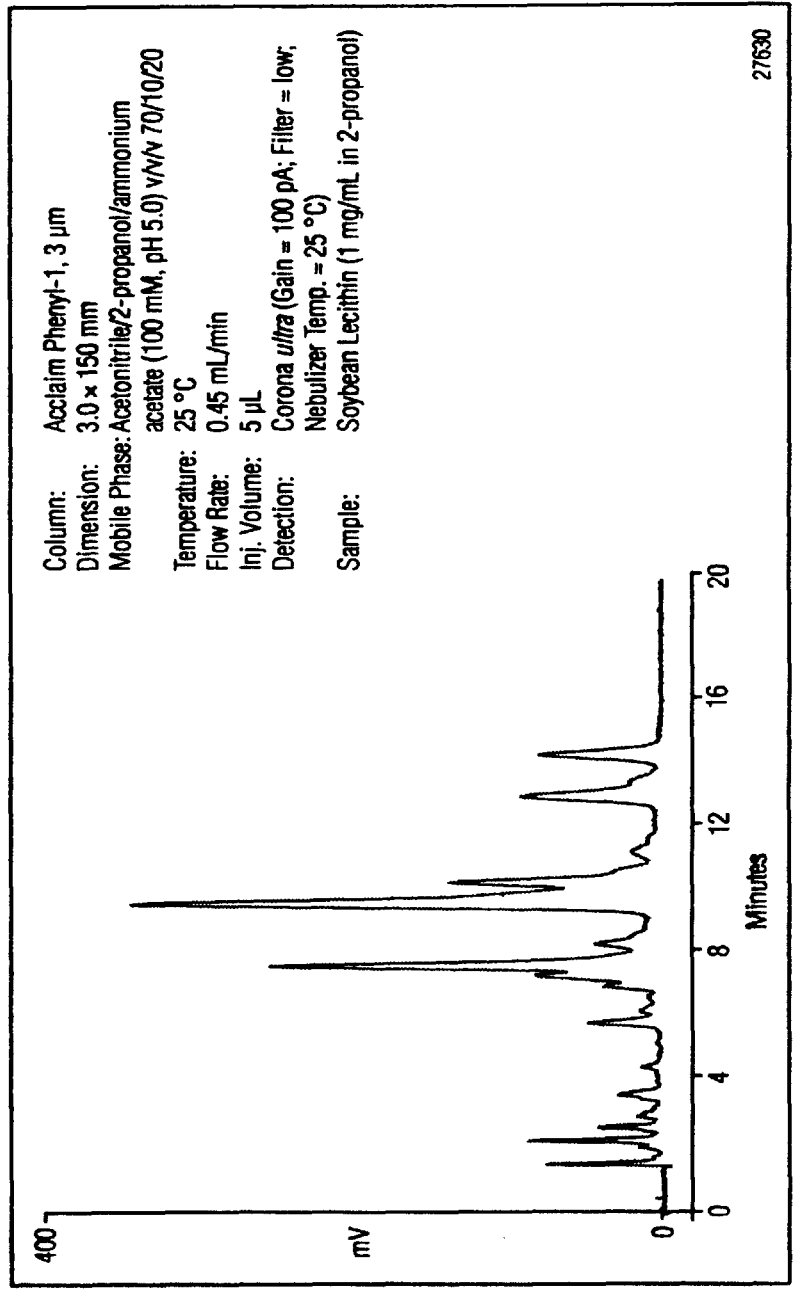
FIG. 13 is a chromatogram showing the separation of phospholipid components of soybean lecithin on an exemplary support of the invention (6).
Figure 14:
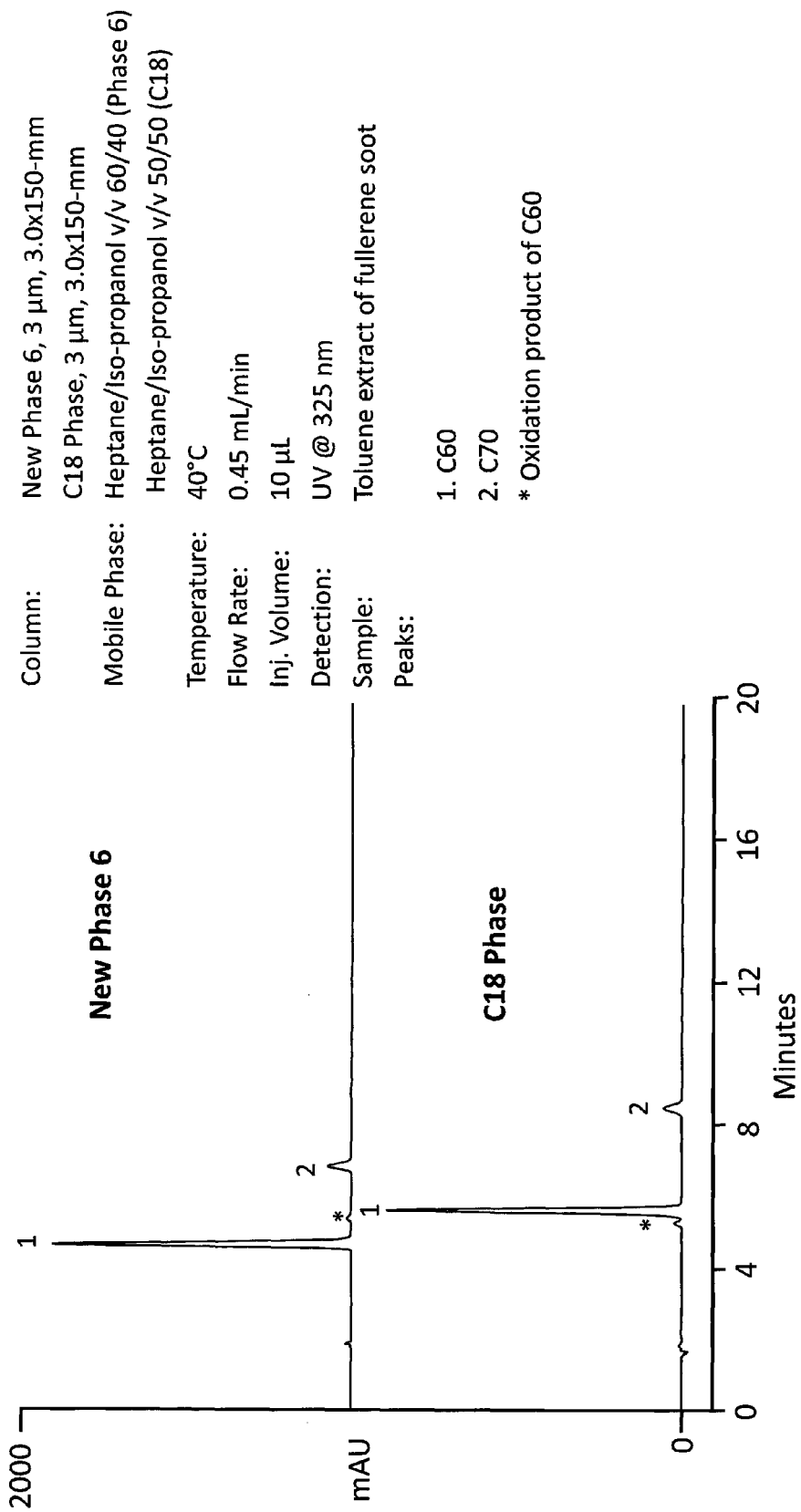
FIG. 14 is a chromatogram showing the full resolution of C60 fullerene and an impurity (*) on a stationary phase of the invention, e.g., 6.

Lecithin is a generic term to designate the yellow-brownish fatty substances occurring in animal and plant tissues. Lecithin has emulsification and lubricant properties, and is a surfactant. Thus, it is widely used for applications in human food, animal feed, pharmaceuticals, paint, and other industrial applications. Phospholipids are a class of lipids and are a major component of all cell membranes as they can form lipid bilayers. Depending on the source, the composition of lecithin can vary. FIG. 12 shows the profiles of lecithin from egg yolk and soybean obtained on a stationary support of the invention, e.g., 6. While both egg yolk and soybean contain phospholipids (e.g., phosphatidylcholine, phosphatidylethanolamine, and phosphatidylinositol) as early eluting peaks (in 2 to 4 min range), it is indicated that egg yolk has a significant quantity of triglycerides as later eluting peaks (from 7 to 13 min). To obtain detailed information on phospholipids composition, a mobile phase containing higher aqueous content and less isopropanol is used to resolve major components of phospholipids in soybean lecithin (FIG. 12).

Fullerenes

The growing usage of nanomaterials is causing emerging concern regarding their environmental behavior in aquatic environments. A major need is the capability to detect and quantify nanomaterials in complex water matrices. C60 fullerene is of special interest because of the widespread application of nanocarbon technology. Accordingly the present invention provides a method of separating Liquid chromatography methods for C60 fullerene analysis are usually performed on reversed-phase C18 columns. We found that compared to C18 phase, the new phase 6 exhibits different selectivity and better resolution between the impurity peak (*) and the C60 peak. As shown in the enlarged version of the same comparison, the new phase 6 can resolve at least five additional minor peaks in higher retention time range, suggesting the existence of larger fullerenes.

Each of the embodiments and examples outlined herein above for the compositions of the invention, equally apply to the methods of the invention. For example, each embodiment regarding the type of the solid support, the size of the solid support particles, the pore size, the structure and nature of the organic ligands, the type and nature of the linker moiety and the type and nature of the aromatic stacking moiety as outlined hereinabove, is equally applicable to all compositions and methods of the invention.

The invention is further illustrated by reference to the non-limiting examples below.

EXAMPLES

Example 1

Synthesis of Reactive Silyl Ligands 1.1 Synthesis of Compound 3

11-Bromo-1-undecene (36.7 g), 32 g of Phthalimide potassium salt and 400 mL N,N-Dimethylformamide was added to a 1000 mL round bottom flask and stirred at room temperature for 30 hours. The solid was filtered off. The material was washed with small amount of toluene. Volatiles were removed by rotary evaporation. Toluene (150 mL) was added. Solid was filtered off. Volatiles were removed by rotary evaporation. Crude material was purified by Kugelrohr distillation.

1.2 Synthesis of Compound 4

11-Bromo-1-undecene (36.7 g), trimethoxysilane (28.8 g) and a platinum catalyst ($H_2PtCl_6$, ~1% wt) was added to a 250 mL flask. The mixture was heated at 80° C. for 24 hours. Volatiles were removed by rotary evaporation. Crude material was purified by Kugelrohr distillation.

1.3 Synthesis of Ligand 5 from 3

Compound 3 (20 g), trimethoxysilane (12.25 g) and a platinum catalyst ($H_2PtCl_6$, 1% wt) was added to a 250 mL flask. The mixture was heated at 80° C. for 24 hours. Volatile was removed by rotary evaporation. Crude material was purified by Kugelrohr distillation, 210° C./0.04 mmHg.

1.4 Synthesis of Ligand 5 from 4

11-bromoundecyltrimethoxysilane (30 g), 17 g of phthalimide potassium salt and 200 mL of N,N-dimethylformamide was added to a 500 mL round bottom flask and stirred at room temperature for 30 hours. The solid was filtered off. The solid was washed with a small amount of toluene. The volatiles were removed by rotary evaporation. Toluene (100 mL) was added to the mixture. The solid was filtered off. Volatiles were removed by rotary evaporation. Crude material was purified by Kugelrohr distillation.

Example 2

Synthesis of Bonded Phase

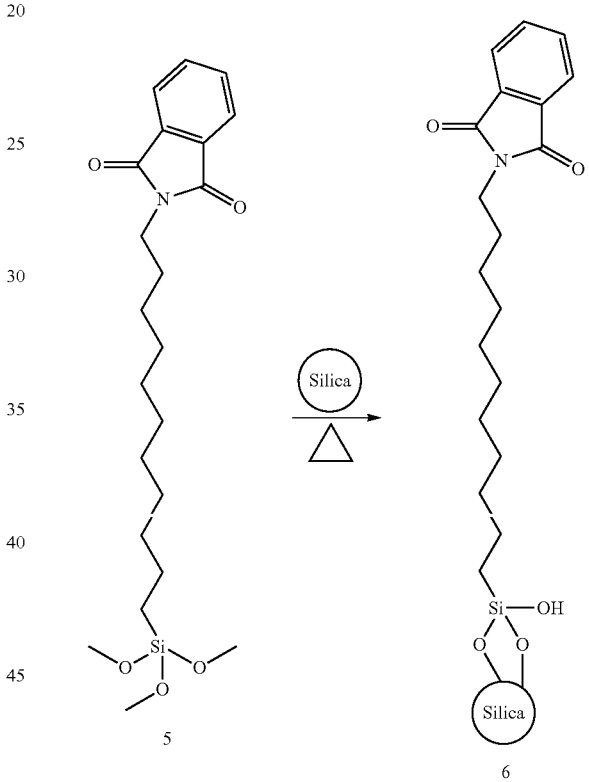

2.1 General Method

Reactive silanes, such as 5, are covalently attached to a variety of substrates, such as silica gel, glass plates, alumina, zirconia and the like. The silica gel can be porous silica with various pore sizes, preferably from about 60 Å to about 5000 Å. The reaction can be carried out in a slurry of silica gel and an inert solvent, such as toluene, at elevated temperature. Addition of water, acid or base may catalyze the reaction to enhance surface coverage depending on the intended application for the resulting material.

2.2 Preparation of Silica Based Solid Support 6

A solution of silyl ligand 5 (10 g) in anhydrous toluene (40 mL) was added to dried silica gel (10 g). After carefully dispersing the above slurry, the reaction mixture was stirred and refluxed for 48 h. The functionalized silica particles are filtered off and thoroughly washed with toluene to give the solid support 6. For chromatography applications, the resulting silica was end-capped with hexamethyldisilazane to give the final product 6.

Example 3

Chromatographic Evaluation

This section describes the chromatographic evaluation of selected compositions of the invention. Samples were prepared from high purity raw silica gel with the following physical properties: average particle size: 3-μm; specific surface area: 300 m2/g; average pore size: 120 Å; pore volume: 1.00 mL/g. A 150 mm×4.6 mm (i.d.) 316 stainless steel HPLC column housing was packed with material 6 using high-pressure slurry packing technique.

Figure 4:
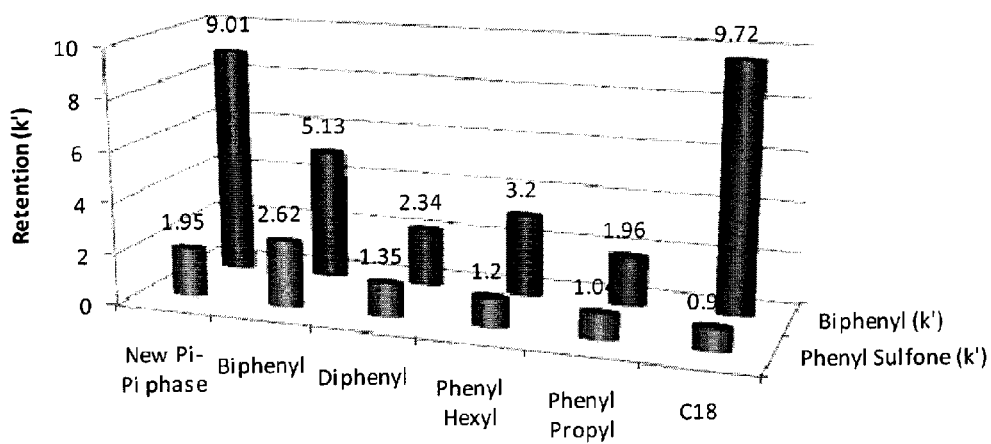
FIG. 4 is a plot showing the exceptional retention of an exemplary support of the invention (6) for both the hydrophilic and hydrophobic aromatics.
Figure 5:
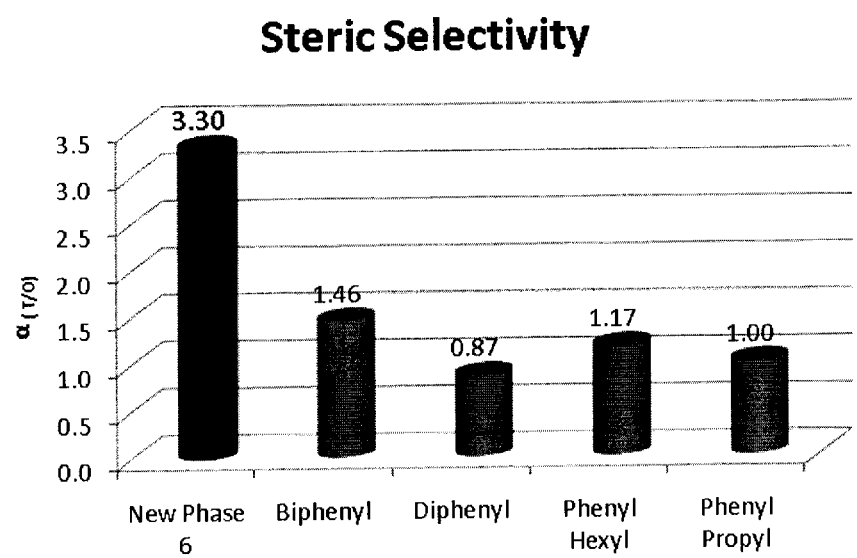
FIG. 5 is a plot showing the aromatic selectivity of an exemplary stationary phase (6) of the invention.

3.1 Retention of Aromatic Compounds (FIG. 4) and High Aromatic Selectivity (FIG. 5)

When compared with other phenyl-type columns, the new phase exhibited a much higher overall retention capacity for both hyrophobic aromatics (FIG. 4): it has the highest retention for bi-phenyl among all commercial phenyl columns. More importantly, the new phase also provided better aromatic selectivity. FIG. 5 demonstrates that the new phase ranks highest in aromatic selectivity, which is even higher than the stationary phase with the densest aromatic character (Biphenyl phase). These experiments demonstrate that the new phase 6 is capable of stronger aromatic interaction than other commercially available phenyl phases. Enhanced aromatic selectivity is beneficial for applications in drug development and testing where compounds commonly contain rings, conjugation, and ring substituents.

3.2 Shape Selectivity (FIG. 6)

Triphenylene (T) and o-terphenyl (O) contain the same number of carbon number but in different shapes—the former planar; the latter "propeller". Retention factor ratio between triphenylene (T) and o-terphenyl (O), α T/O=kT/kO. This descriptor is a measure of the shape selectivity, which is influenced by the spacing of the ligands and probably also the shape and functionality of the silylating reagent. High shape selectivity suggests a better chance of resolving analytes with different shape. As shown in FIG. 6, compared to the high-bonding density C18 phase using the same lot of silica gel, the new phase 6 provides remarkably much higher steric selectivity, i.e., at least about 3-fold.

3. De-Wetting Test (FIG. 7)

The column packed with bonded phase 6 was tested in 0.1% formic acid at 30° C. A freshly packed column was washed with 10 column volumes of CH$_3$CN, and then equilibrated with 20 column volumes of mobile phase. The sample solution contains cytosine, uracil and thymine. In the stop-flow experiment, each testing cycle consisted of two steps. Step one: the column was equilibrated with a mobile phase for 5 min, then the sample was injected and the data acquisition was conducted for another 5 min. Step two: flow was stopped for 5 min before starting the next cycle. Twenty cycles were performed.

Most reversed phase columns have high ligand densities designed to improve the peak shape of basic analytes and stability at extreme pHs. However, dense surface coverage of silica particles with hydrocarbon chains often leads to inconsistent retention times in 100% aqueous conditions (i.e. de-wetting). Although the low ligand density bonding is used to achieve better compatibility with 100% aqueous mobile phases, these phases provide poor peak shapes for bases and lower hydrolytic stability. As shown in FIG. 7, the new phase 6 performed consistently well under 100% aqueous conditions—only negligible loss of retention was observed after twenty stop-flow cycles.

All publications and patent documents cited in this application are incorporated by reference in their entirety for all purposes to the same extent as if each individual publication or patent document were so individually denoted. By their citation of various references in this document, Applicants do not admit any particular reference is "prior art" to their invention.

What is claimed is:

1. A composition comprising:
   a solid support having a surface;
   organic ligands comprising an aromatic imidyl moiety covalently bound to said surface through a linker comprising at least 11 carbon atoms wherein said ligands are:

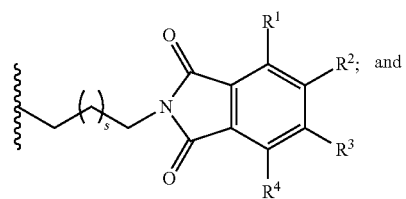

in which,
   s is an integer which is 9 or greater;
   $R^1$, $R^2$, $R^3$, and $R^4$ are members independently selected from H, substituted or unsubstituted alkyl, substituted or unsubstituted heteroalkyl, substituted or unsubstituted aryl, and substituted or unsubstituted heteroaryl, wherein $R^5$ is H, and two or more of $R^1$, $R^2$, $R^3$ and $R^4$, together with the atoms to which they are attached, are optionally joined to form a fused ring structure with the phenyl ring.

2. The composition of claim 1 wherein said solid support is a particle.

3. The composition of claim 1 wherein said support comprises a flow-through monolith.

4. The composition of claim 1 wherein said support is in particulate form, and wherein multiple support particles are disposed in a packed bed.

5. The composition of claim 1 wherein said support comprises a member selected from silica, alumina, titania, zirconia, and combinations therefrom.

6. The composition of claim 1 wherein said support comprises a silica monolith.

7. The composition of claim 1 wherein said support comprises silica gel.

8. The composition of claim 1, wherein said support comprises a polymeric synthetic organic polymer.

9. The composition of claim 1, wherein said ligands comprise an alkyl chain having at least 11 carbon atoms in sequence.

10. The composition of claim 9, wherein at least two of said carbon atoms in sequence are part of a ring selected from substituted or unsubstituted aryl, substituted or unsubstituted heteroaryl and substituted or unsubstituted cycloalkyl.

11. The composition of claim 1, wherein said ligands comprise an alkyl chain of sufficient length to impart reverse phase chromatographic properties to said composition.

12. The composition of claim 1 in a flow-through bed suitable for use as a chromatographic medium.

13. A chromatography column packed with a separation medium comprising a composition of claim 1.

14. A chromatographic method comprising flowing a liquid through a bed of separation medium comprising the composition of claim 1.

15. The chromatographic method of claim 14, wherein said liquid comprises anions, cations and uncharged molecules, each essentially retained by said separation medium.

16. A method of separating analytes in a liquid sample comprising flowing said liquid sample through a chromatographic medium comprising a composition according to claim 1.

* * * * *

UNITED STATES PATENT AND TRADEMARK OFFICE
CERTIFICATE OF CORRECTION

PATENT NO. : 9,144,756 B2
APPLICATION NO. : 13/111882
DATED : September 29, 2015
INVENTOR(S) : Xiadong Liu et al.

Page 1 of 1

It is certified that error appears in the above-identified patent and that said Letters Patent is hereby corrected as shown below:

In the claims

In claim 5, column 26, line 49:

please replace "therefrom" with -- thereof --.

Signed and Sealed this
Second Day of August, 2016

Michelle K. Lee
*Director of the United States Patent and Trademark Office*